United States Patent
Schmitz et al.

(10) Patent No.: US 11,261,543 B2
(45) Date of Patent: Mar. 1, 2022

(54) FLASH SPINNING PROCESS

(71) Applicant: DUPONT SAFETY & CONSTRUCTION, INC., Wilmington, DE (US)

(72) Inventors: Corneille Schmitz, Aywaille (BE); Jan Van Meerveld, Remich (LU); Orest Skoplyak, Newark, DE (US); Serge Rebouillat, Echenevex (FR)

(73) Assignee: DUPONT SAFETY & CONSTRUCTION, INC., Wilmington, DE (US)

( * ) Notice: Subject to any disclaimer, the term of this patent is extended or adjusted under 35 U.S.C. 154(b) by 400 days.

(21) Appl. No.: 15/172,753

(22) Filed: Jun. 3, 2016

(65) Prior Publication Data

US 2016/0362816 A1 Dec. 15, 2016

Related U.S. Application Data

(60) Provisional application No. 62/174,014, filed on Jun. 11, 2015.

(51) Int. Cl.
*D01D 1/02* (2006.01)
*D01F 6/06* (2006.01)
(Continued)

(52) U.S. Cl.
CPC .............. *D01F 6/06* (2013.01); *D01D 1/02* (2013.01); *D01D 5/11* (2013.01); *D01D 11/00* (2013.01); *D01F 1/10* (2013.01)

(58) Field of Classification Search
CPC ...... B29C 47/0014; B29C 48/05; D01D 1/02; D01D 5/11
See application file for complete search history.

(56) References Cited

U.S. PATENT DOCUMENTS 3,081,519 A  3/1963  Blades et al.
3,227,794 A  1/1966  Anderson et al.
(Continued)

FOREIGN PATENT DOCUMENTS

EP  0877834 A1  11/1998
JP  3159765 B2 *  4/2001
(Continued)

OTHER PUBLICATIONS 1H,6H-Perfluorohexane, ChemicalBook, https://www.chemicalbook.com/ChemicalProductProperty_EN_CB5359358.htm, retrieved Dec. 31, 2020, 2 pages. (Year: 2020).*
(Continued)

*Primary Examiner* — Matthew J Daniels

(57) ABSTRACT

A process for the preparation of plexifilamentary film-fibril strands of polymer. The process includes the steps of generating a spin fluid containing (a) 5 to 30 wt. % containing one or more polymer types, (b) a primary spin agent selected from the group consisting of dichloromethane, cis-1,2-dichloroethylene and trans-1,2-dichloroethylene, and (c) a co-spin agent comprising 1H,6H-perfluorohexane or 1H-perfluorohexane or 1H-perfluoroheptane. The spin fluid is flash-spun at a pressure that is greater than the autogenous pressure of the spin fluid into a region of lower pressure to form plexifilamentary film-fibril strands of the polymer. The co-spin agent is present in the spin fluid in an amount sufficient to form an azeotrope-like composition with the primary spin agent in the presence of the one or more polymer types. The polymer may be selected from the group consisting of high density polyethylene, polypropylene, polybutene-1, polymethylpentene, polyvinylidene fluoride, poly (ethylene tetrafluoroethylene), and blends of the foregoing.

13 Claims, 32 Drawing Sheets

(51) Int. Cl.
*D01D 5/11* (2006.01)
*D01D 11/00* (2006.01)
*D01F 1/10* (2006.01)

(56) References Cited

U.S. PATENT DOCUMENTS

| | | |
|---|---|---|
| 5,250,237 A | 10/1993 | Shin |
| 5,977,237 A | 11/1999 | Shin et al. |
| 6,004,672 A | 12/1999 | Shin et al. |
| 6,458,304 B1 | 10/2002 | Shin et al. |
| 7,179,413 B1 | 2/2007 | Shin et al. |
| 2001/0006729 A1 | 7/2001 | Akki et al. |
| 2004/0119196 A1 | 6/2004 | Shin |
| 2008/0108749 A1* | 5/2008 | Chen ........................ C08K 5/09 524/795 |
| 2014/0134498 A1 | 5/2014 | Lim et al. |

FOREIGN PATENT DOCUMENTS

| | | |
|---|---|---|
| JP | 3159765 U | 4/2001 |
| WO | 99/36600 A1 | 1/1999 |
| WO | 00/36194 A1 | 6/2000 |
| WO | 02/052072 A1 | 7/2002 |
| WO | 2015/196217 A1 | 12/2015 |

OTHER PUBLICATIONS

International Search Report, dated Sep. 12, 2016, for International application No. PCT/US2016/036340, filed Jun. 8, 2016; ISA European Patent Office; Catherine Vandeput Authorized officer.

* cited by examiner

FLASH SPINNING PROCESS

FIELD OF THE INVENTION

The present invention relates to the field of spinning fibers, and more particularly flash spinning of fibers.

BACKGROUND

Flash spinning is a process for producing fibers that involves spinning a polymer from a spin fluid. In the flash spinning process, the spin agent must be recovered and if possible re-used. Recovery and re-use are time and resource extensive operations that if simplified can result in cost savings and quality improvements in the product.

The present inventors have discovered spin agent compositions that allow for simplified spin agent composition processes under more suitable pressure and temperature conditions. These compositions can be used for a broad range of different polymers and blends thereof.

SUMMARY OF THE INVENTION

In one embodiment the invention is directed to a process for the preparation of plexifilamentary film-fibril strands of polymer. The process comprises the steps of;

(i) generating a spin fluid of (a) 5 to 30 wt. % of spin fluid comprising one or more polymer types, (b) a primary spin agent selected from the group consisting of dichloromethane, cis-1,2-dichloroethylene and trans-1,2-dichloroethylene, and (c) a co-spin agent comprising 1H,6H-perfluorohexane, 1H-perfluoroheptane, or 1H-perfluorohexane, and (ii) flash-spinning the spin fluid at a pressure that is greater than the autogenous pressure of the spin fluid into a region of lower pressure to form plexifilamentary film-fibril strands of the polymer.

The co-spin agent is present in the spin fluid in an amount sufficient to form an azeotrope-like composition with the primary spin agent in the presence of the one or more polymer types. In one embodiment, the co-spin agent and the primary spin agent are present in the spin fluid in amounts sufficient to form an azeotrope or azeotrope-like composition in the presence of the at least one or more polymer types that are at the weight % selected in (a), above.

The polymer may be selected from the group consisting of polyethylene, polypropylene, polybutene-1, poly(4-methyl-1-pentene), polyvinylidenefluoride, poly (ethylene tetrafluoroethylene), and blends of the foregoing.

In the further embodiment of the process, the ratio of primary spin agent dichloromethane to 1H,6H-perfluorohexane is between 73:27 and 100:0 by weight.

In another further embodiment of the process, the ratio of primary spin agent dichloromethane to 1H-perfluorohexane is between 52:48 and 66:34 by weight.

In another further embodiment of the process, the ratio of primary spin agent dichloromethane to 1H-perfluoroheptane is between 70:30 and 89:11 ratio by weight.

In the further embodiment of the process, the ratio of primary spin agent trans-1,2-dichloroethylene to 1H,6H-perfluorohexane is between 72:28 and 100:0 by weight.

In another further embodiment of the process, the ratio of primary spin agent trans-1,2-dichloroethylene to 1H-perfluorohexane is between 47:53 and 64:36 by weight.

In another further embodiment of the process, the ratio of primary spin agent trans-1,2-dichloroethylene to 1H-perfluoroheptane is between 67:33 and 100:0 ratio by weight.

The process of the invention is also directed to embodiments in which blends of polymers are present for which less than all of the polymers present are being processed at azeotropic or near-azeotropic compositions of the spin agent. For example hardware can be tailored and equipped to those effects, with suitable elements to create multiple pressure/temperature relaxation modes, purges, vents and/or suitable in-situ or external separations to affect the compositions.

In one embodiment the process for the preparation of plexifilamentary film-fibril strands of polymer comprises the use of a spin fluid comprising a primary spin agent that is dichloromethane, cis-1,2-dichloroethylene, or trans-1,2-dichloroethylene, with a secondary co-spin agent that is 1H-hexane, 1H,6H-hexane, or 1H-heptane, in a composition that is sufficient to form a cloud point.

DETAILED DESCRIPTION

Figure 1:
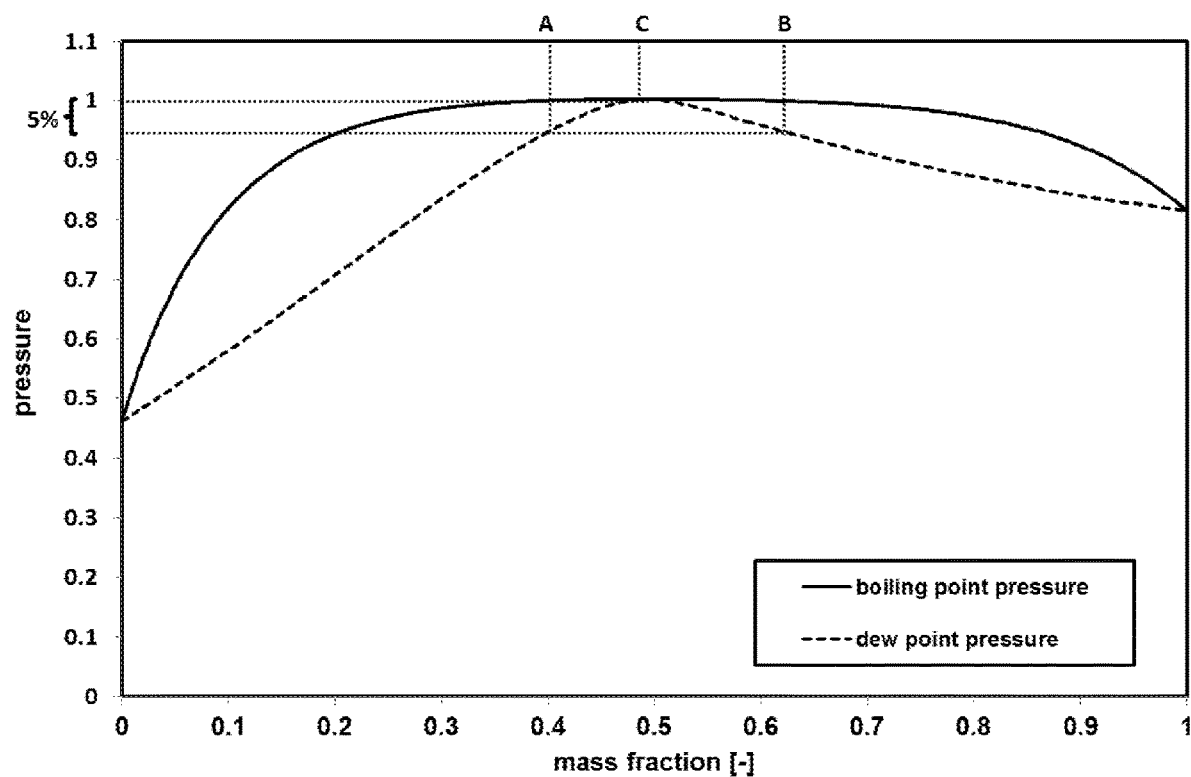
FIG. 1 illustrates the position of the azeotrope point and the azeotrope-like boundaries in a binary mixture of solvents.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether such ranges are separately disclosed. Where a range of numerical values is recited herein, unless otherwise stated, the range is intended to include the endpoints thereof, and all integers and fractions within the range.

The term "polymer" as used herein, generally includes but is not limited to, homopolymers, copolymers (such as for example, block, graft, random and alternating copolymers), terpolymers, etc. and blends and modifications thereof. Furthermore, unless otherwise specifically limited, the term "polymer" shall include all possible geometrical configurations of the material. These configurations include, but are not limited to isotactic, syndiotactic and random symmetries.

The term "polyethylene" as used herein is intended to encompass not only homopolymers of ethylene, but also copolymers wherein at least 85% of the recurring units are ethylene units. One preferred polyethylene is high-density polyethylene which has an upper limit of melting range of about 130 to 140° C., a density in the range of 0.94 to 0.98 gram per cubic centimeter, and a melt index (MI) of between 0.1 and 100, preferably less than 4.

The term "polypropylene" is intended to embrace not only homopolymers of propylene but also copolymers where at least 85% of the recurring units are propylene units. Isotactic and syndiotactic polypropylene are preferred forms.

The term "polymer type" refers to the chemical class into which the polymer falls, for example, polyethylene, polypropylene, polyvinylidene fluoride, poly (ethylene tetrafluoroethylene) copolymer, and so on.

The term "plexifilamentary" as used herein, means a three-dimensional integral network of a multitude of thin, ribbon-like, film-fibril elements of random length and a median fibril width of less than about 25 microns. In plexifilamentary structures, the film-fibril elements are generally coextensively aligned with the longitudinal axis of the structure and they intermittently unite and separate at irregular intervals in various places throughout the length, width and thickness of the structure to form a continuous three-dimensional network.

The term "spin fluid" refers to the total composition that is spun using the spinning apparatus described herein. Spin fluid includes polymer and spin agent.

The term "spin agent" refers to the solvent or mixture of solvents and any additives, solubility aids and blends therewith that is used to initially dissolve the polymer to form the spin fluid.

The dew point pressure is the pressure at which, at constant temperature, a vapour, vapour mixture, or vapour-gas mixture starts condensing into liquid.

The boiling point pressure is the pressure at which, at constant temperature, a liquid, liquid mixture, or liquid-solution starts to form vapour.

The azeotropic composition is the composition of a mixture of fluids at which the boiling point pressure equals the dew point pressure. In this work, the azeotropic compositions are determined at 40° C. and expressed in mass fractions. Point C on FIG. 1 corresponds to the azeotropic composition.

"Azeotropic-like compositions" are compositions of fluids which exhibit only small differences between the boiling point pressure and the dew point pressure, i.e. the boiling point pressure is different by less than 5% from the dew point pressure (both expressed in absolute pressure). In this work, the azeotropic-like compositions are determined at 40° C. and expressed in mass fractions. Azeotropic-like compositions correspond to the compositions between and including point A and point B on FIG. 1. The phrases "Azeotropic-like" and "azeotrope-like" and "azeotrope like" are used interchangeably herein.

By "cloud point" it is meant the pressure and temperature at which a clear single phase spin fluid separates into two phases. At the cloud phase a clear spin fluid becomes turbid. The turbidity is determined following the protocol described herein.

U.S. Pat. No. 3,081,519 to Blades et al. assigned to E. I. du Pont de Nemours and Company, Wilmington, Del. (hereafter DuPont) discloses a process for making flash-spun plexifilamentary film-fibril strands from a fiber-forming polymer in a liquid spin agent that is not a solvent for the polymer below the liquid's normal (atmospheric pressure) boiling point. As disclosed in U.S. Pat. No. 3,227,794 to Anderson et al. (assigned to DuPont), the flash-spinning process requires a spin agent that: (1) is a non-solvent to the polymer below the spin agent's normal boiling point; (2) forms a solution with the polymer at high pressure; (3) forms a desired two-phase dispersion with the polymer when the solution pressure is reduced slightly in a letdown chamber; and (4) flash vaporizes when released from the letdown chamber into a zone of substantially lower pressure through a spin orifice.

Dichloromethane (DCM) and cis- or trans-1,2-dichloroethylene (DCE) are examples of solvents for polymers, and in particular polyolefins (e.g., polyethylene and polypropylene) that are commercially available. However, their cloud-point pressures are so close to the bubble point that it is not considered feasible to use them alone as spin agents. By employing co-spin agents, the solvent power of the mixture is lowered sufficiently so that flash spinning to obtain the desired plexifilamentary product is readily accomplished.

The present inventors have discovered that it is possible to flash spin a spin fluid of 5 to 30 wt. % of total spin fluid of polymer, and a spin agent comprising a primary spin agent selected from the group consisting of dichloromethane, cis-1,2-dichloroethylene and trans-1,2-dichloroethylene, and a co-spin agent comprising 1H,6H-perfluorohexane, 1H-perfluorohexane, or 1H-perfluoroheptane in an azeotropic mixture or azeotropic-like mixture with the primary spin agent.

Examples

A study was been performed for the phase behavior and flash spinning of high density polyethylene, polypropylene, polybutene-1, poly(1-methyl-4-pentene), polyvinylidene fluoride and poly(ethylene tetrafluoroethylene) for azeotropic and azeotropic like compositions. The experimental procedure and results are provided below.

Materials Used

The dichloromethane (DCM) used was a high purity grade of 99.99% purity from Merck. (Dichloromethane, also known as methylene chloride, has a CAS Nr. of 75-09-2.) Dichloromethane has a molecular weight of 84.9 g/mol and an atmospheric boiling point of 39.9° C. The dichloromethane is used as received.

The trans-1,2-dichloroethylene (t-1,2-DCE) used was a high purity grade of 99.99% purity from Sigma-Aldrich. (Trans-1,2-dichloroethylene has a CAS Nr. of 156-60-5.) Trans-1,2-dichloroethylene has a molecular weight of 96.9 g/mol and an atmospheric boiling point of 47.7° C. The trans-1,2-dichloroethylene is used as received.

1H,6H-perfluorohexane (CAS Nr. 336-07-2) was purchased from Apollo Scientific, Units 3 & 4, Parkway, Denton, Manchester, M34 3SG, United Kingdom. 1H,6H-perfluorohexane is also purchased from Exfluor Research Corporation, 2350 Double Creek Dr., Round Rock, Tex., 78664, United States. 1H,6H-perfluorohexane has a purity level of about 95% and used as received. The molecular mass is equal to 302 g/mol and the atmospheric boiling temperature equals 92.6° C. The 1H,6H-perfluorohexane was used as received.

1H-perfluorohexane (CAS Nr. 355-37-3) was purchased from Apollo Scientific, Units 3 & 4, Parkway, Denton, Manchester, M34 3SG, United Kingdom. The molecular mass is equal to 320 g/mol and the reported boiling temperature by the Apollo Scientific equals 71.6° C. The 1H-perfluorohexane is used as received.

1H-perfluoroheptane (CAS Nr. 27213-61-2) was purchased from Apollo Scientific, Units 3 & 4, Parkway, Denton, Manchester, M34 3SG, United Kingdom. The molecular mass is equal to 370 g/mol and the reported atmospheric boiling temperature by the manufacturer is 97° C. The 1H-perfluoroheptane is used as received.

The polyethylene was a commercial grade high density polyethylene (HDPE) from Total—refining and chemicals, grade 5802 with a density of 0.957 g/cm3 (ISO 1183), melt flow index of 0.3 (ISO 1133/D, 190° C./2.16 kg) and 22 (ISO 1133/G, 190° C./21.6 kg).

The polypropylene (PP) used in the examples is a commercial grade Total PPH 4065 from Total Chemicals. The MFR is 4.2 g/10 min (ISO 1133, 2.16 kg-230° C.).

Polybutene-1 (PB-1) used was the commercial grade PB-1 0300M from Lyondell-Basell. The density is 0.915 g/cm3 and MFR is 4.0 g/10 min (ISO 1133/D, 190° C., 2.16 kg). The PB-1 was used as received.

The poly(4-methyl-1-pentene) (P4M1P) used is a medium molecular weight grade purchased from Sigma-Aldrich Chemie GmbH. The Product number is 190993. The reported melting point is 235° C. Poly(4-methyl-1-pentene) is also known as polymethylpentene (PMP)

Polyvinylidene fluoride (PVDF) was performed with Kynar® 710, Kynar® 720 and Kynar® 740 grades from Arkema. The Kynar® 710 has a specific gravity of 1.77-1.79 g/cm$^3$ (ASTM D792 23° C.), melting point of 165-172° C. and melt flow rate of 19.0-35.0 g/10 min (ASTM D1238, 450° F., 3.8 kg load). Kynar® 720 has specific gravity of 1.77-1.79 g/cm3 (ASTM D792 23° C.), melting point of 165-172° C. and melt flow rate of 5.0-29.0 g/10 min (ASTM D1238, 450° F., 3.8 kg load). Kynar® 740 has specific gravity is 1.77-1.79 g/cm3 (ASTM D792 23° C.), melting point of 165-172° C. and melt flow rate of 1.5-3.0 g/10 min (ASTM D1238, 450° F., 3.8 kg load).

The ethylene tetrafluoroethylene used in the examples is commercial grade Tefzel® 2183 from DuPont de Nemours. Ethylene tetrafluoroethylene is also known as poly(ethene-co-tetrafluoroethene) or poly(ethylene tetrafluoroethylene). Reported technical properties are a nominal melting point of 255-280° C. (ASTM D3418), Flow rate of 6 g/10 min (ASTM D3159) and a specific gravity 1.7 (ASTM D792).

All polymers are used as received. Polymers were dried during a minimum of 8 hours in a vacuum over of 400 mbar and temperature of about 45-50° C. before being used.

Spinning Equipment

In summary, the apparatus used consisted of two high pressure cylindrical chambers, each equipped with a piston which is adapted to apply pressure to the contents of the vessel. The cylinders have an inside diameter of 1.0 inch (2.54×10$^{-2}$ m) and each has an internal capacity of 50 cubic centimeters. The cylinders are connected to each other at one end through a 3/32 inch (2.3×10$^{-3}$ m) diameter channel and a mixing chamber containing a series of fine mesh screens used as a static mixer. In the channel a Type J thermocouple is in contact with the spin fluid to record the temperature. Mixing is accomplished by forcing the contents of the vessel back and forth between the two cylinders through the static mixer. A spinneret assembly with a quick-acting means for opening the orifice is attached to the channel through a tee. The spinneret assembly consists of a lead hole of 0.25 inch ($6.3 \times 10^{-3}$ m) diameter and about 2.0 inch ($5.08 \times 10^{-2}$ m) length, and a spinneret orifice of 0.030 inch ($7.62 \times 10^{-4}$ m) diameter and 0.030 inch ($7.62 \times 10^{-4}$ m) length. A pressure transmitter is mounted in the lead hole to measure the pressure of the spin fluid. The pistons are driven by high pressure hydraulic system.

In operation, the apparatus was charged with polymer pellets and spin agent and a pressure of at least 50 barg is applied to the pistons to compress the charge and avoid the spin fluid from boiling during subsequent heating. The contents then were heated to mixing temperature and held at that temperature for about 30 to 45 minutes during which time a differential pressure was alternatively established between the two cylinders to repeatedly force the contents through the mixing channel from one cylinder to the other to provide mixing and effect formation of a spin fluid. The spin fluid temperature was then raised to the final spin temperature, and held there for about 5 to 10 minutes to equilibrate the temperature. The pressure of the spin fluid is kept above the cloud point pressure during mixing and during the raise from the mixing temperature to the spin temperature. Mixing is continued throughout this period. In addition, the pressure transducer in the lead hole is calibrated at the spin temperature. The accumulator pressure was set to that desired for spinning at the end of the mixing cycle to simulate the letdown chamber effect. Next, the valve between the spin cell and the accumulator is opened, and then the spinneret orifice is opened immediately thereafter in rapid succession. It usually took about two to five seconds to open the spinneret orifice after opening the valve between the spin cell and the accumulator. This time should correspond to the residence time in the letdown chamber. When letdown chambers are used, the residence time in the chamber is usually 0.2 to 0.8 seconds. However, it has been determined that residence time does not have much effect on fiber morphology and/or properties as long as it is greater than about 0.1 second but less than about 30 seconds. The resultant flash-spun product was collected in a stainless steel open mesh screen basket. The pressure recorded just before the spinneret using a computer during spinning was entered as the spin pressure.

For cloud-point pressure determination, the spinneret assembly was replaced with a view cell assembly containing a ½ inch ($1.23 \times 10^{-2}$ m) diameter high pressure sight glass, through which the contents of the cell could be viewed as they flow through the channel. The window was lighted by means of a fiber optic light guide, while the content at the window itself was displayed using a digital camera. In the cell a Type J thermocouple is located about 5 mm behind the high pressure sight glass. The Type J thermocouple and a pressure measuring device located in close proximity to the window provide the pressure and temperature details of the cell behind the sight glass respectively. The temperature and pressure of the contents at the window were continuously monitored by a computer. When a clear, homogeneous polymer-spin liquid mixture was established after a period of mixing, the temperature was held constant, and the differential pressure applied to the pistons was equalized, so that the pistons stopped moving. Then the pressure applied to the contents of the view cell was gradually decreased until a second phase formed in the view cell behind the high pressure sight glass. This second phase can be observed through the sight glass in the form of cloudiness of the once clear, homogeneous polymer-spin liquid mixture. The temperature and pressure was measured by the Type J thermocouple and pressure transducer at the condition where the thermocouple is no longer visible. This pressure is the phase separation pressure or the cloud-point pressure at that temperature for that polymer-spin liquid mixture. For an approximate constant temperature typically two or three measurements are performed. Once these data are recorded, mixing was again resumed, while the content was heated to the temperature where the next phase separation pressure or cloud-point pressure has to be measured.

Results

Dichloromethane:1H,6H-Perfluorohexane Vapor Liquid Equilibrium

Figure 2:
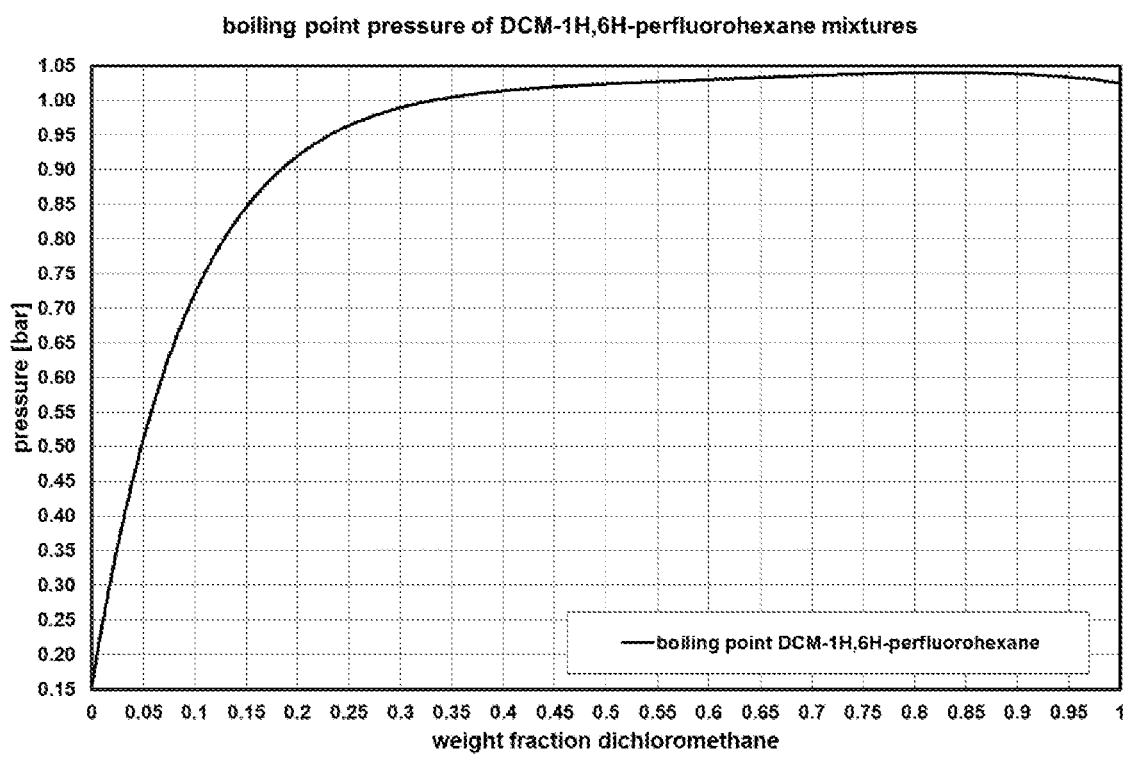
FIG. 2 shows a graph of boiling point pressures of DCM and 1H,6H-perfluorohexane mixtures@ 40° C., as a function of the weight fraction of dichloromethane

FIG. 2 shows a graph of boiling point pressure of mixtures of dichloromethane and 1H,6H-perfluorohexane@ 40° C., as a function of the weight fraction of dichloromethane. The azeotropic composition of dichloromethane and 1H,6H-perfluorohexane at 40° C. corresponds to about 83 wt % dichloromethane and about 17 wt % 1H,6H-perfluorohexane. For a temperature of 40° C. the pressure for the boiling point of the azeotropic composition is equal to 104 kPa. For compositions between the azeotropic composition and pure dichloromethane it was found that the pressure associated to the dew point and boiling point are very similar. Azeotrope like compositions with a variation between the dew point and boiling point pressures of less than 5% can be defined from a weight ratio of dichloromethane to 1H,6H-perfluorohexane of 100:0 wt % to about 73:27 wt-%.

Cloud Point Study and Flash Spin Performance of Polyethylene

Figure 3:
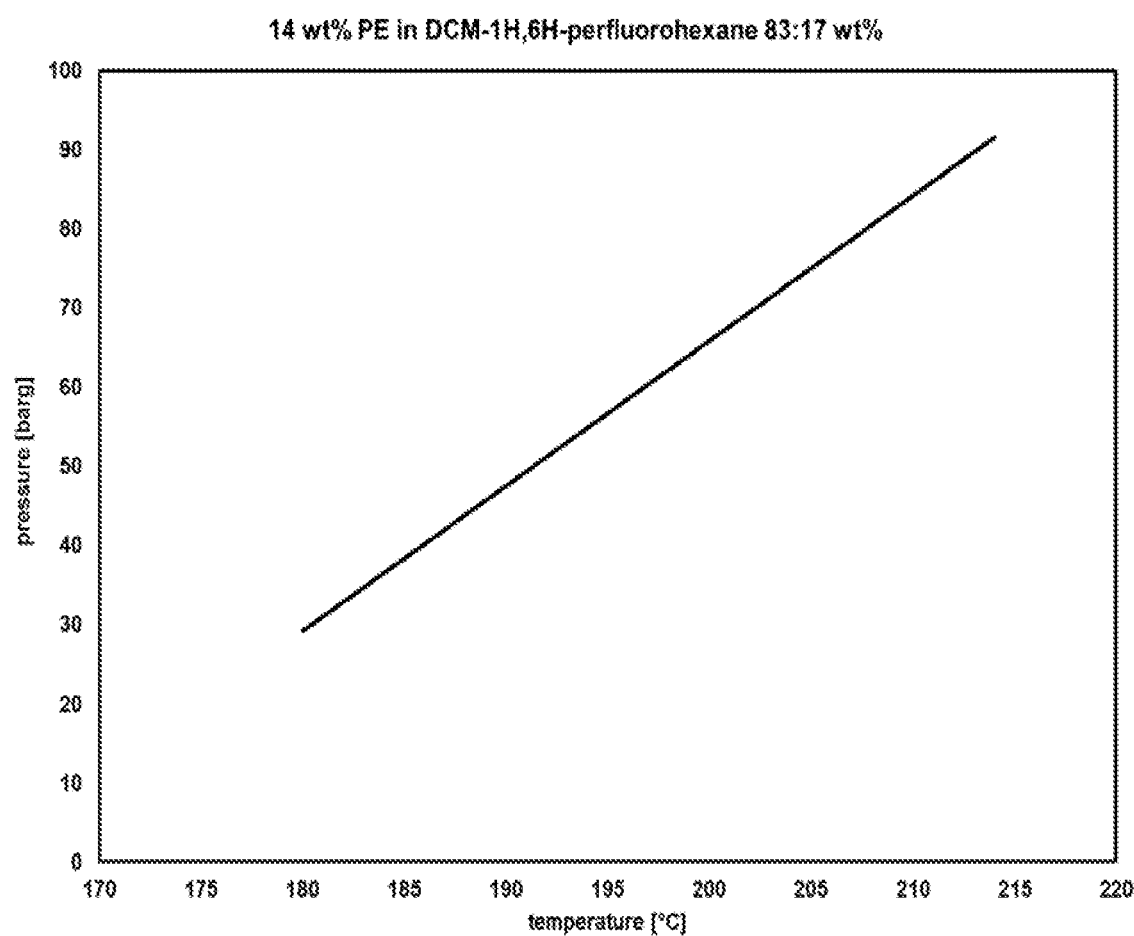
FIG. 3 shows the results of a cloud point curve of 14 wt % high density polyethylene (HDPE) in DCM-1H,6H-perfluorohexane in a 83:17 wt % composition.

FIG. 3 shows the cloud point curve of 14 wt % high density polyethylene (HDPE) in a spin agent of dichloromethane and 1H,6H-perfluorohexane in a 83:17 wt % composition. 14 wt % of high density polyethylene was found soluble in a spin agent of dichloromethane and 1H,6H-perfluorohexane in a 83:17 ratio by weight. Flash spin experiments were successfully performed using the spinning equipment described for a high density polyethylene polymer concentration of 14 wt % from a spin agent of DCM and 1H,6H-perfluorohexane in a 83:17 ratio by weight.

TABLE 1

Description of flash spin experiments of high density polyethylene (HDPE).

| | | | |
|---|---|---|---|
| Polymer | NAME | [—] | HDPE |
| | Type | [—] | Total 5802 |
| | Tot. | wt % | 14 |
| spin agent | | 1 | DCM |
| | | 2 | 1H,6H-perfluorohexane |
| | composition | wt %:wt % | 83/17 |
| spin condition | spin orifice | mil × mil | 30 × 30 |
| | Pressure | bar g | 44 |
| | temperature | ° C. | 200 |

Cloud Point Study and Flash Spin Performance of Polypropylene

Figure 4:
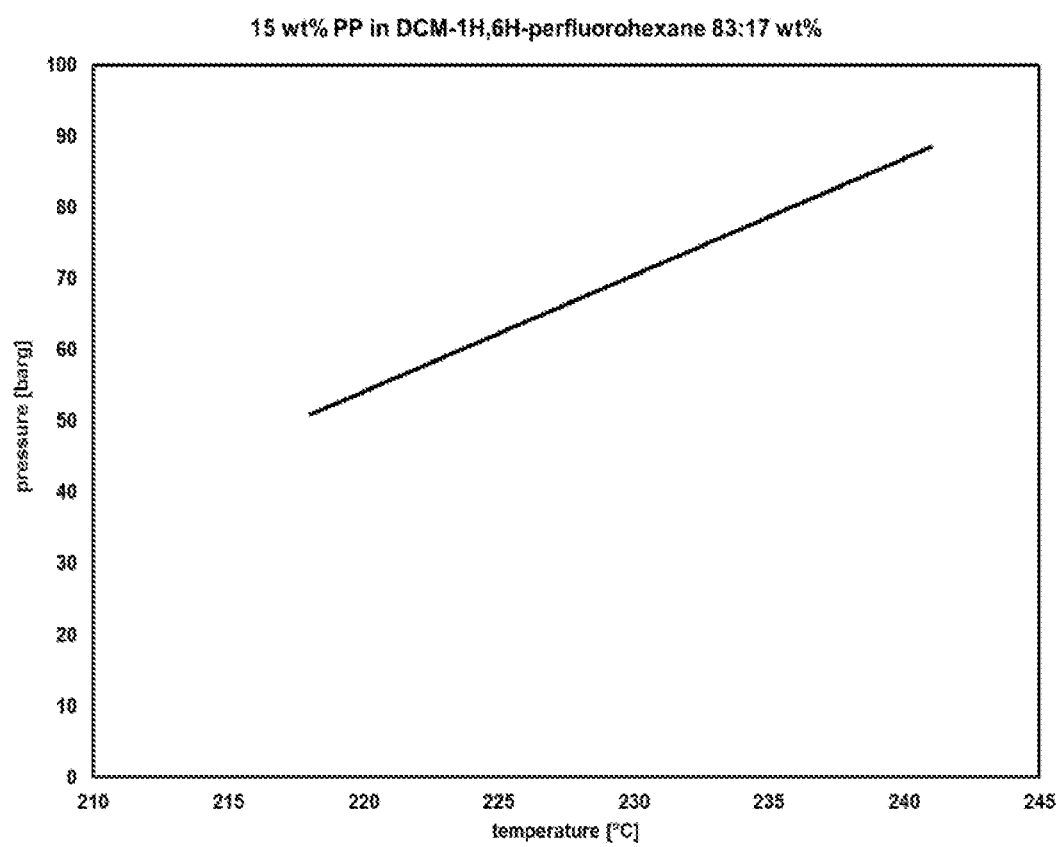
FIG. 4 shows the results of a cloud point curve of 15 wt % PP in DCM-1H,6H-perfluorohexane in 83:17 ratio by weight.
Figure 5:
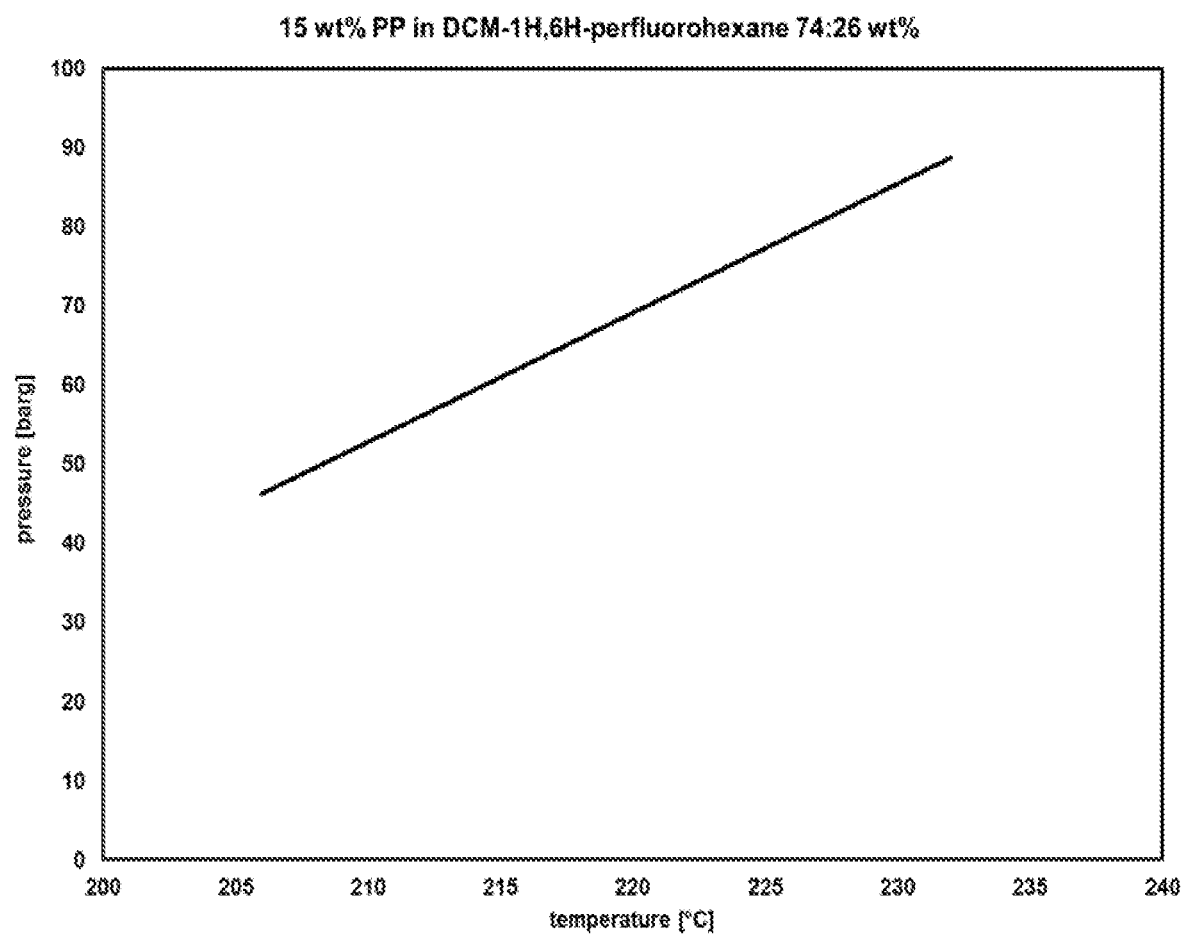
FIG. 5 shows the results of a cloud point curve of 15 wt % PP in DCM-1H,6H-perfluorohexane in 74:26 ratio by weight.

FIG. 4 shows the cloud point curve of 15 wt % PP in a spin agent of DCM and 1H,6H-perfluorohexane in a 83:17 ratio by weight. FIG. 5 shows the cloud point curve of 15 wt % PP in a spin agent consisting of DCM and 1H,6H-perfluorohexane in a 74:26 ratio by weight. 15 wt % of polypropylene were found soluble in spin agents of dichloromethane and 1H,6H-perfluorohexane in a 83:17 and 74:26 ratio by weight, respectively. Flash spin experiments were performed using the spinning equipment for polypropylene polymer concentration for 10 and 15 wt % from a spin agent of DCM and 1H,6H-perfluorohexane in a 83:17 and 74:26 ratio by weight, respectively.

TABLE 2

Description of flash spin experiments of polypropylene.

| Polymer | NAME | [—] | PP | PP | PP | PP |
|---|---|---|---|---|---|---|
| | Type | [—] | Total PP | Total PP | Total PP | Total PP |
| | Tot. | wt % | 10 | 10 | 15 | 15 |
| spin agent | 1 | | DCM | | | |
| | 2 | | 1H-6H Perfluorohexane | | | |
| | composition | wt %:wt % | 74/26 | 83/17 | 83/17 | 74/26 |
| spin condition | spin orifice | mil × mil | 30 × 30 | 30 × 30 | 30 × 30 | 30 × 30 |
| | spin pressure | bar g | 55 | 63 | 56 | 72 |
| | temperature | ° C. | 220 | 230 | 230 | 230 |

Cloud Point Study and Flash Spin Performance of Polybutene-1

Figure 6:
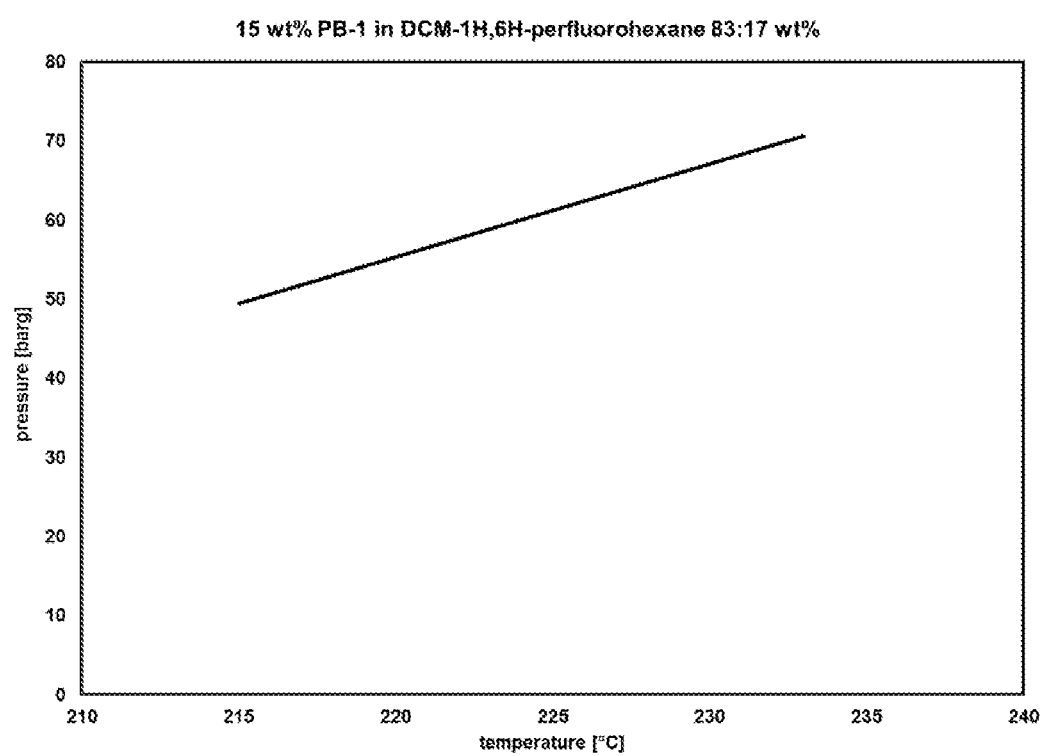
FIG. 6 shows the cloud point curve for 15 wt % PB-1 in DCM-1H,6H-perfluorohexane in a 83:17 wt % composition.
Figure 7:
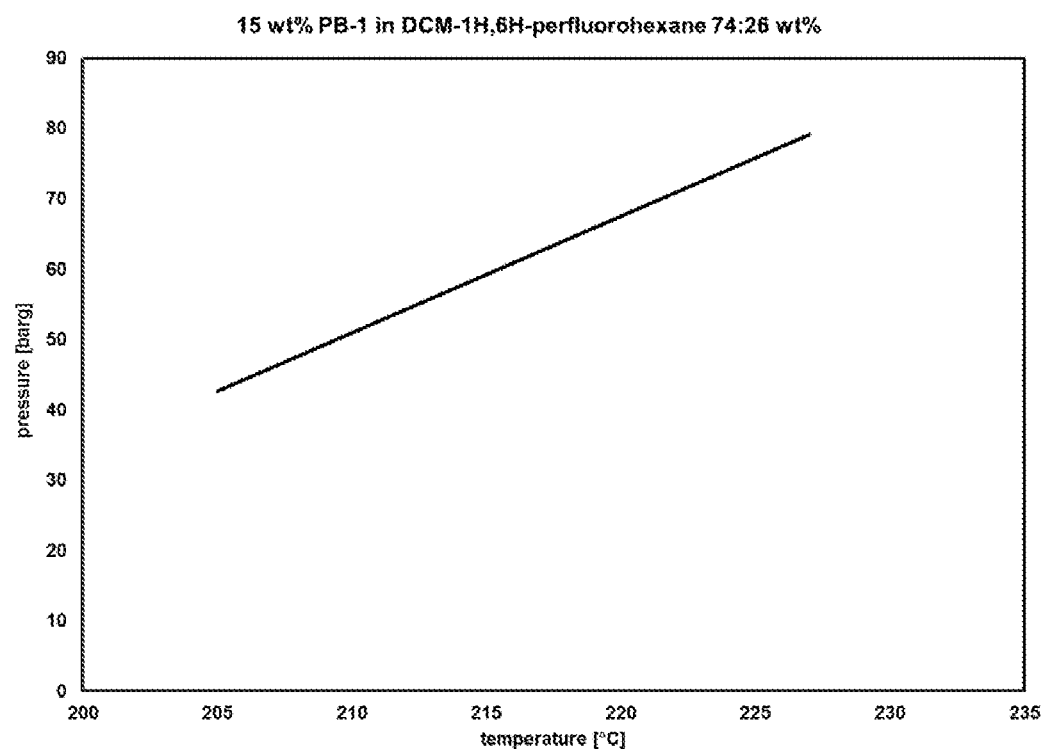
FIG. 7 shows the cloud point curve for 15 wt % PB-1 in DCM-1H,6H-perfluorohexane in a 74:26 wt % composition.

FIG. 6 shows the cloud point curve for 15 wt % polybutene-1 (PB-1) in a spin agent consisting of DCM and 1H,6H-perfluorohexane in a 83:17 ratio by weight. FIG. 7 shows the cloud point curve for 15 wt % polybutene-1 (PB-1) in a spin agent consisting of DCM and 1H,6H-perfluorohexane in a 74:26 ratio by weight. 15 wt % of polybutene-1 was found soluble in a spin agent consisting of dichloromethane and 1H,6H-perfluorohexane in a 83:17 and 74:26 ratio by weight. Flash spin experiments were performed using the spinning equipment for blends of HDPE and PB-1 with a total concentration of 14 and 18 wt % from a spin agent of DCM and 1H,6H-perfluorohexane in a 83:17 ratio by weight.

TABLE 3

Description of flash spin experiments of poly-1-butene and HDPE

| Polymer 1 | NAME | [—] | HDPE | HDPE |
|---|---|---|---|---|
| | Type | [—] | Total 5802 | |
| | Tot. | wt % | 80 | 60 |
| Polymer 2 | NAME | [—] | PB-1 | PB-1 |
| | Type | [—] | PB 0300M | |
| | Tot. | wt % | 20 | 40 |
| | Total polymer concentration | wt % | 14 | 18 |
| spin agent | 1 | [—] | DCM | |
| | 2 | [—] | 1H,6H-perfluorohexane | |
| | composition | wt %:wt % | 83/17 | 83/17 |
| spin condition | spin orifice | mil × mil | 30 × 30 | 30 × 30 |
| | spin pressure | bar g | 63 | 61 |
| | spin temp. | ° C. | 230 | 210 |

Cloud Point Study and Flash Spin Performance of Polyvinylidene Fluoride (PVDF)

Figure 8:
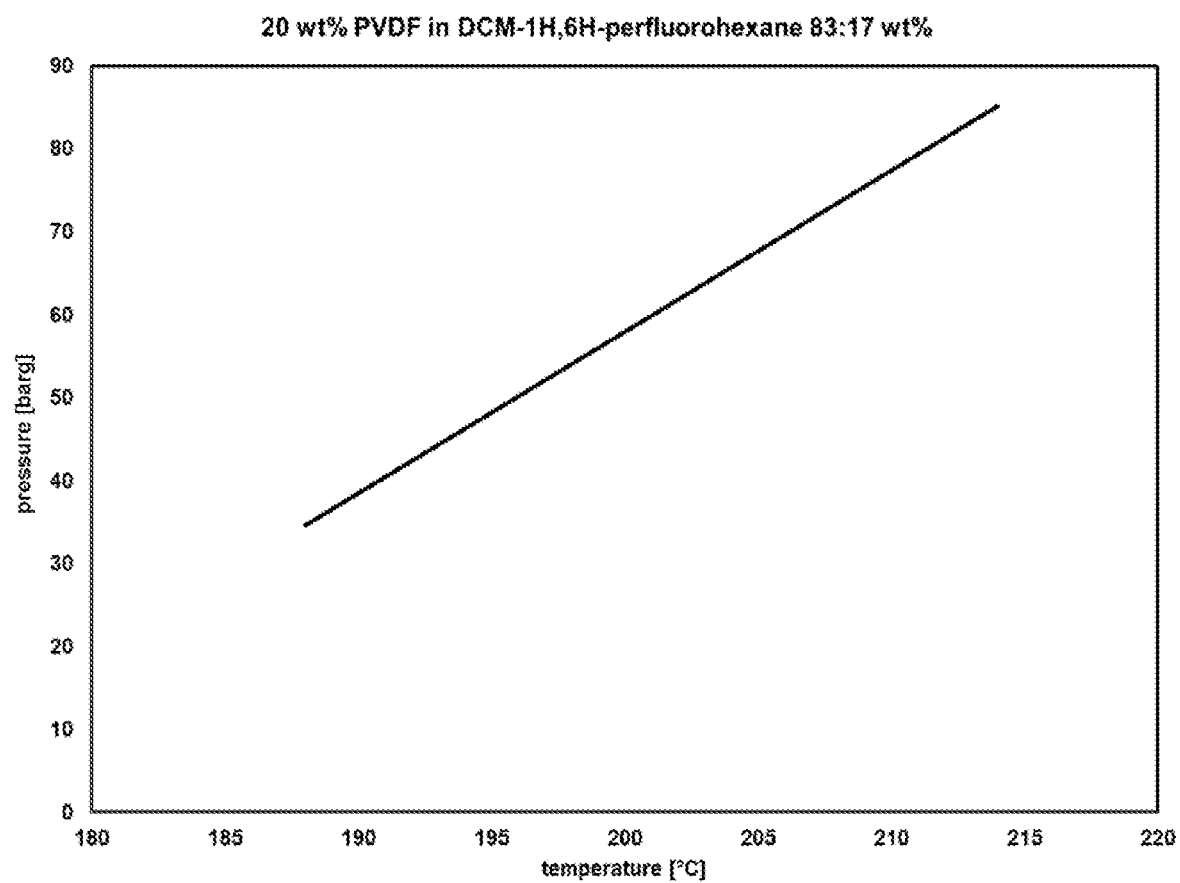
FIG. 8 shows the cloud point curve of 20 wt % PVDF/Kynar® 710 in dichloromethane-1H,6H-perfluorohexane in a 83:17 ratio by weight.

FIG. 8 shows the cloud point curve of 20 wt % PVDF/Kynar® 710 in dichloromethane-1H,6H-perfluorohexane corresponding to a composition of 83:17 ratio by weight. 20 wt % of PVDF/Kynar® 710 was found soluble in mixtures of dichloromethane and 1H,6H-perfluorohexane corresponding to a composition of 83:17 wt %. Flash spin experiments were performed using the spinning equipment described in above for a PVDF/Kynar® 710 concentration of 20 wt % from a spin agent-of DCM and 1H,6H-perfluorohexane in a 83:17 ratio by weight.

TABLE 4

Description of flash spin experiments of polyvinylidene fluoride.

| Polymer | NAME | [—] | PVDF |
|---|---|---|---|
| | Type | [—] | Kynar ® 710 |
| | Tot. | wt % | 20 |
| spin agent | 1 | | DCM |
| | 2 | | 1H,6H-perfluorohexane |
| | Composition | wt %:wt % | 83/17 |
| spin condition | spin orifice | mil × mil | 30 × 30 |
| | spin pressure | bar g | 53 |
| | Temperature | ° C. | 205 |

Dichloromethane:1H-Perfluorohexane Vapor Liquid Equilibrium

Figure 9:
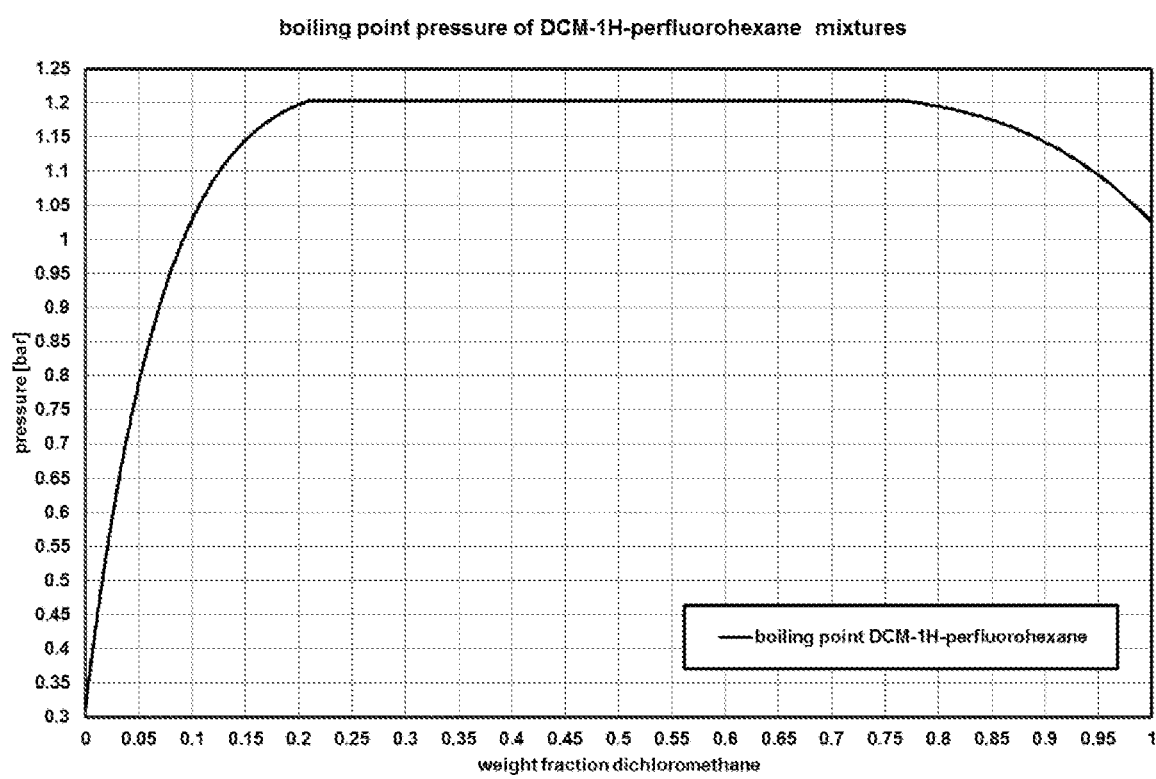
FIG. 9 shows a graph of boiling point pressures of dichloromethane and 1H-perfluorohexane mixtures @ 40° C., as a function of the weight fraction of dichloromethane.

FIG. 9 shows a graph of boiling point pressures of mixtures dichloromethane and 1H-perfluorohexane @ 40° C., as a function of the weight fraction of dichloromethane. The azeotropic composition of dichloromethane and 1H-perfluorohexane at 40° C. corresponds to about 56 wt % dichloromethane and about 44 wt % 1H-perfluorohexane. The dew point and boiling point at 40° C. for the azeotropic composition is equal to about 118 kPa. Azeotropic-like composition with a variation between the dew point and boiling point less than 5% can be defined from a weight ratio of dichloromethane to 1H-perfluorohexane of about 52:48 wt % to about 66:34 wt %.

Cloud Point Study and Flash Spin Performance of Polypropylene

Figure 10:
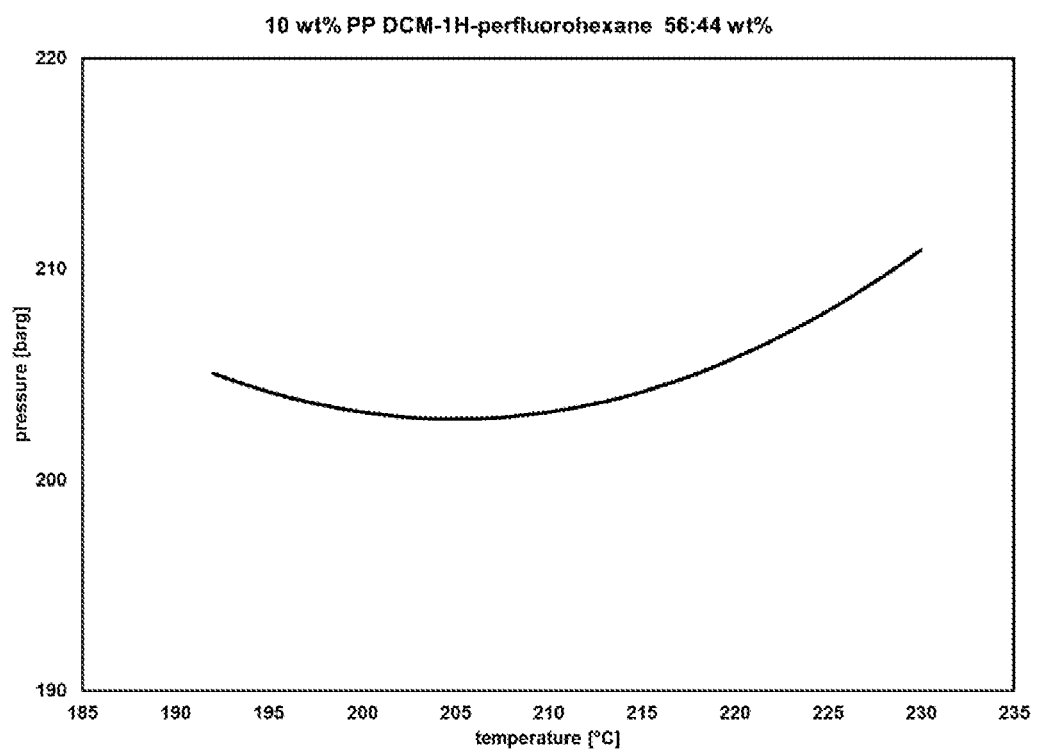
FIG. 10 Cloud point curve of 10 wt % polypropylene in a spin agent of DCM and 1H-perfluorohexane in a 56:44 ratio by weight.
Figure 11:
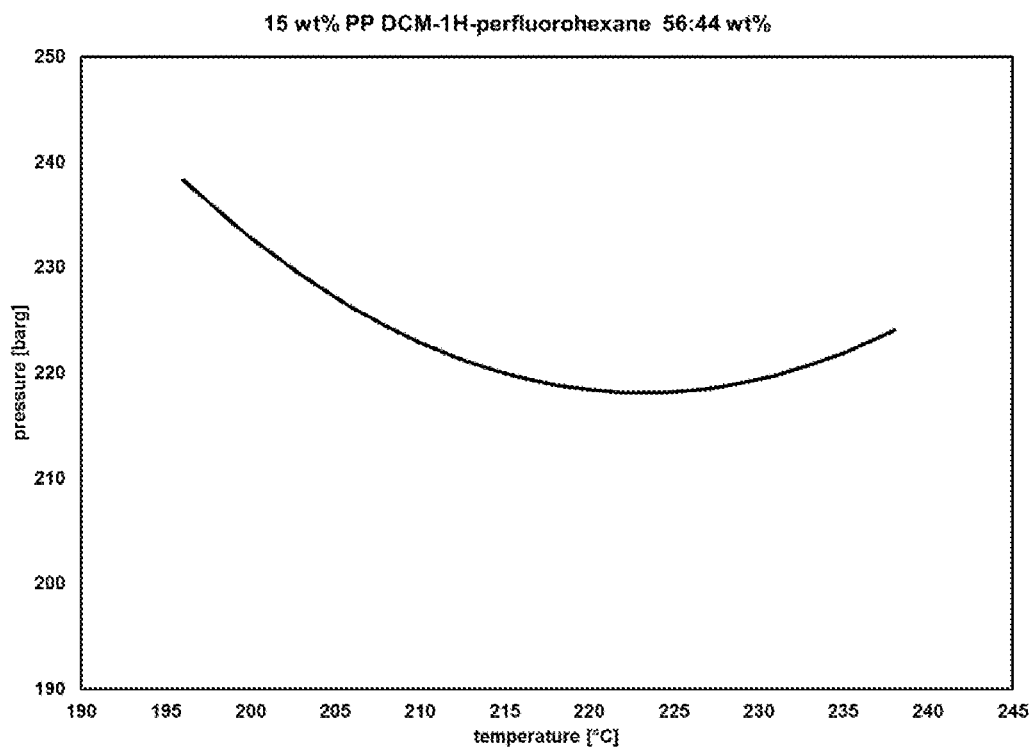
FIG. 11 Cloud point curve of 15 wt % polypropylene in a spin agent of DCM and 1H-perfluorohexane in a 56:44 ratio by weight.

FIG. 10 shows the cloud point curve of 10 wt % polypropylene in a spin agent of dichloromethane and 1H-perfluorohexane in a 56:44 ratio by weight. FIG. 11 shows the cloud point curve of 15 wt % polypropylene in a spin agent of DCM and 1H-perfluorohexane in a 56:44 ratio by weight. 10 and 15 wt % polypropylene were found soluble in a spin agent of dichloromethane and 1H-perfluorohexane in a 56:44 ratio by weight. Flash spin experiments were performed using the flash spinning equipment described for a polymer concentration of 15 wt % PP from a spin agentspin agent of dichloromethane and 1H-perfluorohexane in a 56:44 ratio by weight.

TABLE 5

Description of flash spin experiments of polypropylene.

| Polymer | NAME | [—] | PP |
|---|---|---|---|
| | Type | [—] | Total PPH |

TABLE 5-continued

Description of flash spin experiments of polypropylene.

|  |  | Tot. | wt % | 15 |
|---|---|---|---|---|
| spin | 1 |  |  | DCM |
| agent | 2 |  |  | 1H-perfluorohexane |
|  | composition | wt %:wt % |  | 56/44 |
| spin | spin orifice | mil × mil |  | 30 × 30 |
| condition | spin pressure | barg |  | 200 |
|  | spin temp. | ° C. |  | 230 |

Cloud Point Study of Polybutene-1

Figure 12:
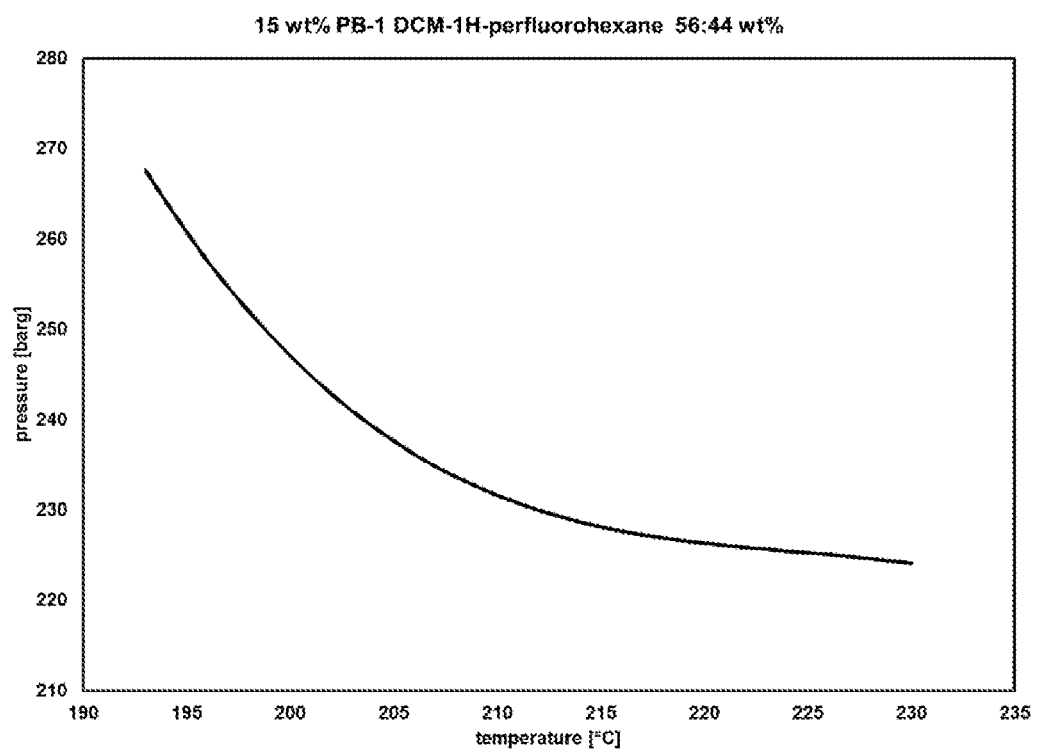
FIG. 12 Cloud point curve for 15 wt % polybutene-1 in a spin agent of DCM and 1H-perfluorohexane in a 56:44 ratio by weight.

FIG. 12 shows the cloud point curve for 15 wt % polybutene-1 in a spin agent of dichloromethane and 1H-perfluorohexane in a 56:44 ratio by weight. 15 wt % polybutene-1 was found soluble in a spin agent of dichloromethane and 1H-perfluorohexane in a 56:44 ratio by weight.

Cloud Point Study of Poly(4-Methyl-1-Pentene)

Figure 13:
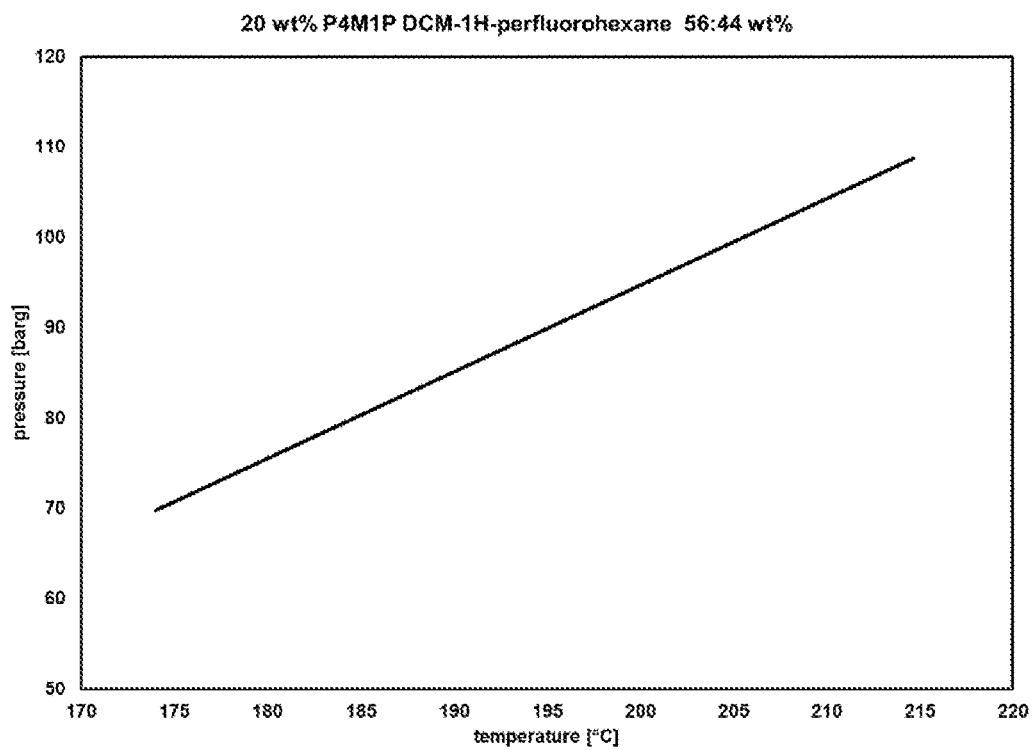
FIG. 13 Cloud point curve of 20 wt % P4M1P in a spin agent of DCM and 1H-perfluorohexane in a 56:44 ratio by weight.
Figure 14:
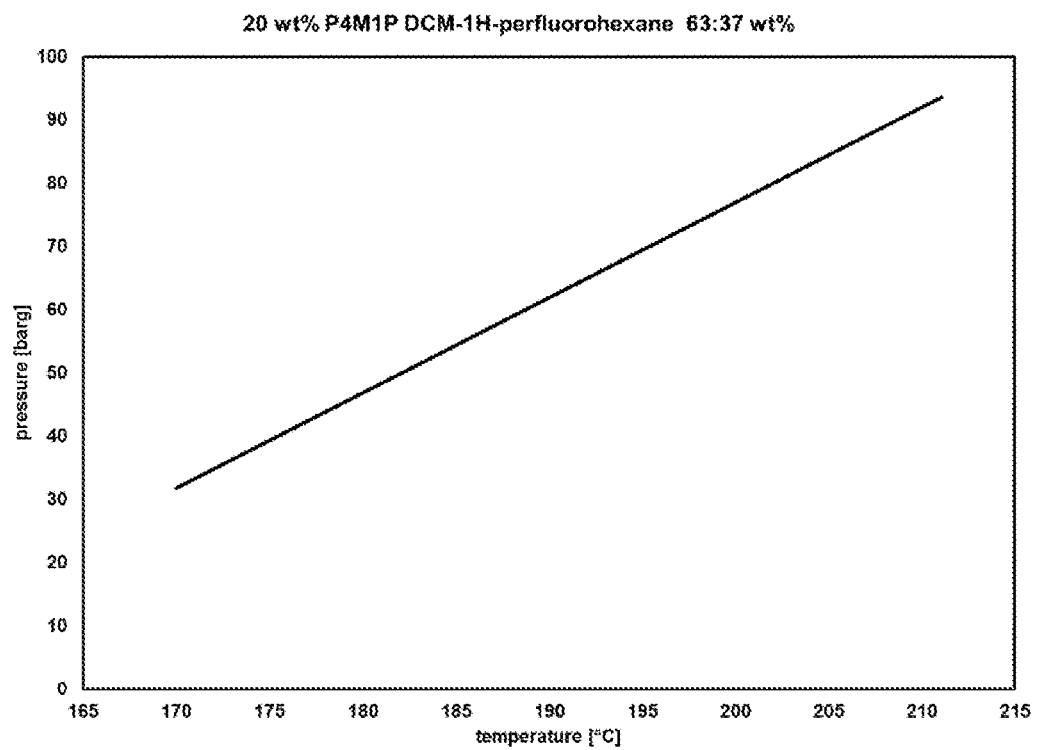
FIG. 14 Cloud point curve of 20 wt % P4M1P in a spin agent of DCM and 1H-perfluorohexane in a 63:37 ratio by weight.

FIG. 13 shows the cloud point curve of 20 wt % P4M1P in a spin agent of dichloromethane and 1H-perfluorohexane in a 56:44 ratio by weight. FIG. 14 shows the cloud point curve of 20 wt % P4M1P in a spin agent of DCM and 1H-perfluorohexane in a 63:37 ratio by weight. 20 wt % poly(4-methyl-1-pentene) (P4M1P) was found soluble in a spin agent consisting of dichloromethane and 1H-perfluorohexane in a 56:44 ratio by weight and 63:37 ratio by weight, respectively.

Cloud Point Study of PVDF

Figure 15:
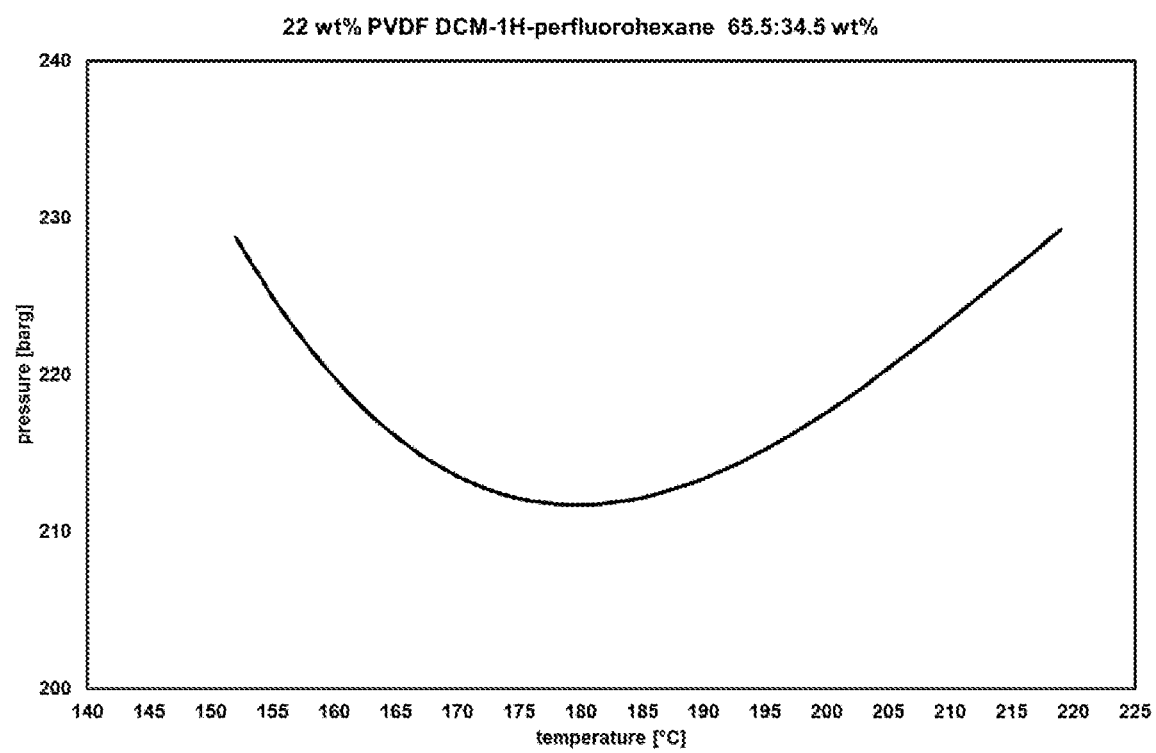
FIG. 15 Cloud point curve of 22 wt % PVDF/Kynar® 720 in a spin agent of DCM and 1H-perfluorohexane in a 65.5:34.5 ratio by weight.
Figure 16:
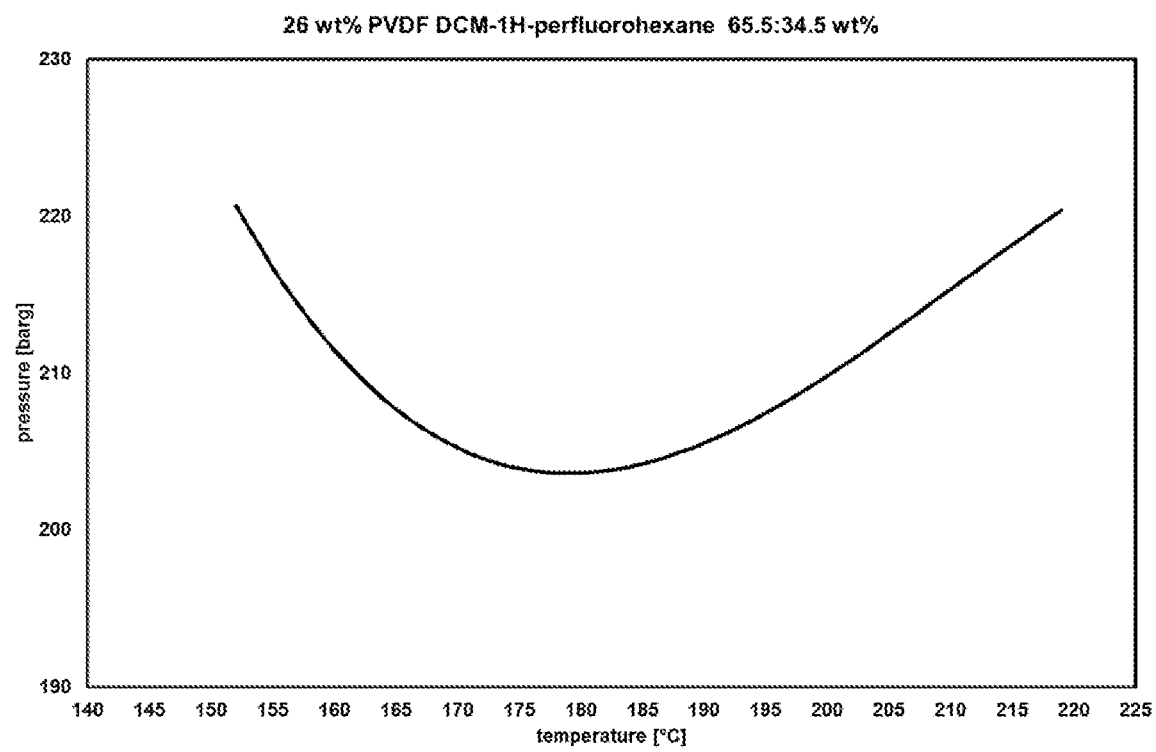
FIG. 16 Cloud point curve of 26 wt % PVDF/Kynar® 720 in a spin agent of DCM and 1H-perfluorohexane in a 65.5:34.5 ratio by weight.

FIG. 15 shows the cloud point curve of 22 wt % PVDF/Kynar® 720 in a spin agent of dichloromethane and 1H-perfluorohexane in a 65.5:34.5 ratio by weight. FIG. 16 shows the cloud point curve of 26 wt % PVDF/Kynar® 720 in a spin agent of dichloromethane and 1H-perfluorohexane in a 65.5:34.5 ratio by weight. 22 and 26 wt % of PVDF were found soluble in a spin agent of dichloromethane and 1H-perfluorohexane in a 65.5:34.5 ratio by weight.

TABLE 6

Description of flash spin experiments of polyvinylidene fluoride.

| Polymer | NAME | [—] | PVDF | PVDF |
|---|---|---|---|---|
|  | Type | [—] | Kynar® 720 | Kynar® 720 |
|  | Tot. | wt % | 22 | 26 |
| spin agent | 1 |  | DCM | DCM |
|  | 2 |  | 1H-perfluoro-hexane | 1H-perfluoro-hexane |
|  | composition | wt %:wt % | 65.5:34.5 | 65.5:34.5 |
| spin condition | spin orifice | mil × mil | 30 × 30 | 30 × 30 |
|  | spin pressure | barg | 207 | 192 |
|  | spin temp. | ° C. | 215 | 200 |

Flash Spinning Experiments of PVDF and Blends of PVDF with PB-1 and P4MIP

Flash spin experiments were performed using the flash-spinning equipment described for polymer concentrations of 22 wt % and 26 wt % PVDF from a spin agent of dichloromethane and 1H-perfluorohexane in a 65.5:34.5 ratio by weight.

In addition, flash spin experiments were performed for a total polymer concentration of 28 wt % composed of a blend of PVDF and PB-1 in a 80:20 ratio by weight and a blend of PVDF and P4M1P in a 80:20 ratio by weight from a spin agent of DCM and 1H-perfluorohexane in a 65.5:34.5 ratio by weight.

TABLE 7

Description of flash spin experiments of blends of polyvinylidene fluoride with poly(butene-1) and poly-4-methyl-pentene.

| Polymer 1 | NAME | [—] | PVDF | PVDF |
|---|---|---|---|---|
|  | Type | [—] | Kynar® 720 | Kynar® 720 |
|  | Tot. | wt % | 80 | 80 |
| Polymer 2 | NAME | [—] | PB-1 | P4M1P |
|  | Type | [—] | PB 0300M | medium molecular weight |
|  | Tot. | wt % | 20 | 20 |
| Total polymer concentration |  | wt % | 28 | 28 |
| spin agent | 1 | [—] | DCM |  |
|  | 2 | [—] | 1H-perfluorohexane |  |
|  | composition | wt %:wt % | 65.5:34.5 | 65.5:34.5 |
| spin condition | spin orifice | mil × mil | 30 × 30 | 30 × 30 |
|  | spin pressure | barg | 195 | 195 |
|  | spin temp. | ° C. | 215 | 215 |

Cloud Point Study and Flash Spin Performance of Poly(Ethylene Tetrafluoroethylene)

Figure 17:
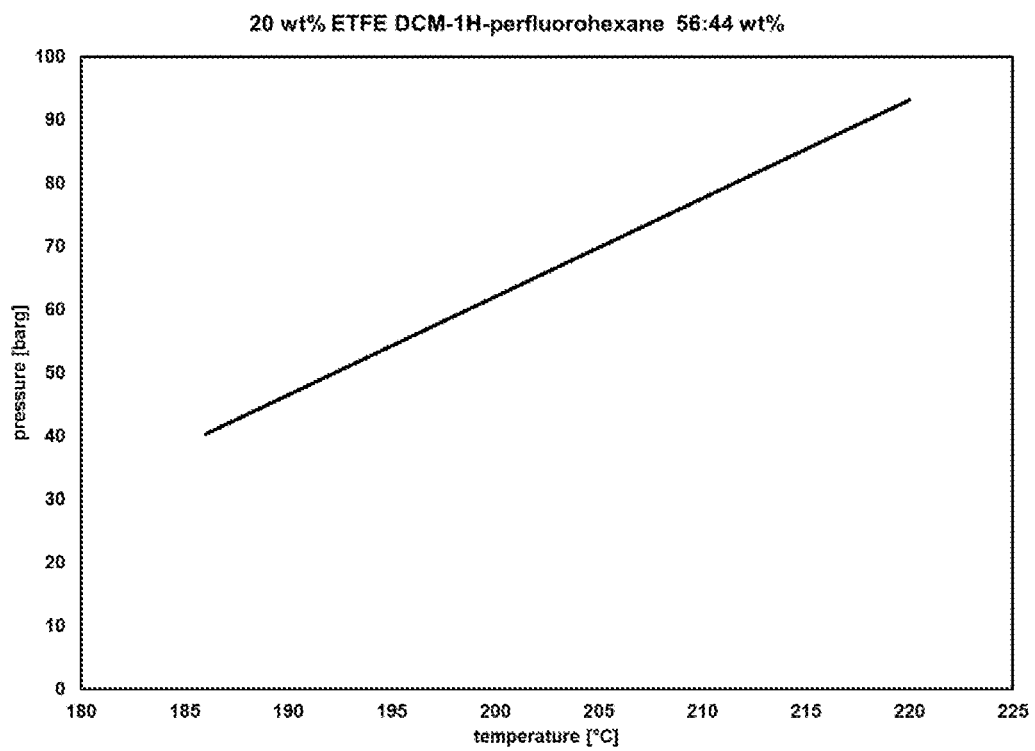
FIG. 17 Cloud point curve of 20 wt % ETFE in a spin agent of DCM and 1H-perfluorohexane in a 56:44 ratio by weight.

FIG. 17 shows the cloud point curve of 20 wt % ETFE in a spinagent of dichloromethane and 1H-perfluorohexane in a 56:44 ratio by weight. 20 wt % of poly (ethylene tetrafluoroethylene) (ETFE) was found soluble in a spinagent of dichloromethane and 1H-perfluorohexane in a 56:44 ratio by weight. Flash spin experiments were performed using the spinning equipment described for 20 wt % poly (ethylene tetrafluoroethylene) (ETFE) polymer concentration from a spin agent of ofdichloromethane and 1H-perfluorohexane in a 56:44 ratio by weight.

TABLE 8

Description of flash spin experiments of poly(ethylene tetrafluoroethylene.)

| Polymer | NAME | [—] | ETFE |
|---|---|---|---|
|  | Type | [—] | Tefzel® 2183 |
|  | Tot. | wt % | 20 |
| spin agent | 1 |  | DCM |
|  | 2 |  | 1H-perfluorohexane |
|  | composition | wt %:wt % | 56:44 |
| spin condition | spin orifice | mil × mil | 30 × 30 |
|  | spin pressure | barg | 47 |
|  | spin temp. | ° C. | 200 |

Dichloromethane:1H-Perfluoroheptane Vapor Liquid Equilibrium

Figure 18:
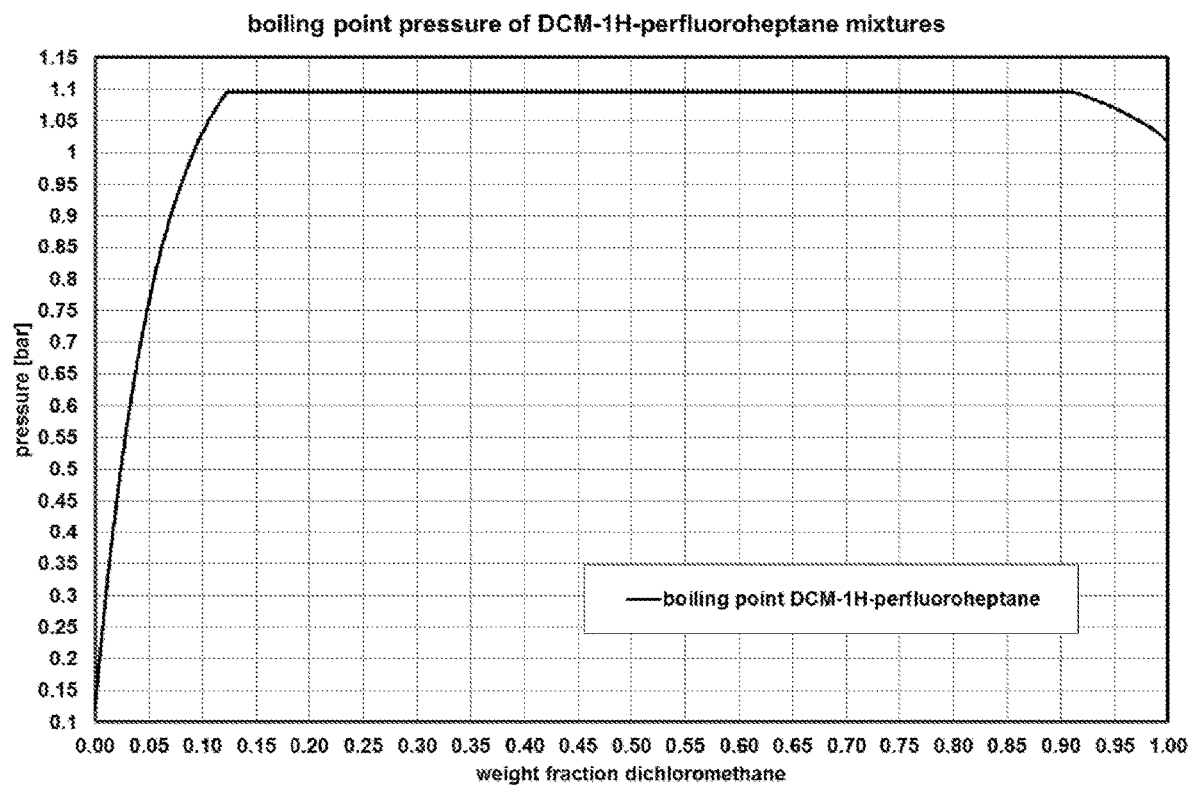
FIG. 18 shows a graph of boiling point pressures of dichloromethane and 1H-perfluoroheptane mixtures @ 40° C., as a function of the weight fraction of dichloromethane.

FIG. 18 shows a graph of boiling point pressures of dichloromethane and 1H-perfluoroheptane mixtures @ 40° C., as a function of the weight fraction of dichloromethane. The azeotropic composition of dichloromethane and 1H-perfluoroheptane at 40° C. corresponds to about 71 wt % dichloromethane and about 29 wt % 1H-perfluoroheptane. The dew point and boiling point at 40° C. for the azeotropic composition is equal to about 109 kPa. Azeotrope like composition with a variation between the dew point and boiling point pressure less than 5% can be defined from a weight ratio of dichloromethane to 1H-perfluoroheptane of about 70:30 ratio by weight to about 89:11 ratio by weight.

Cloud Point Study and Flash Spin Performance of Polyethylene

Figure 19:
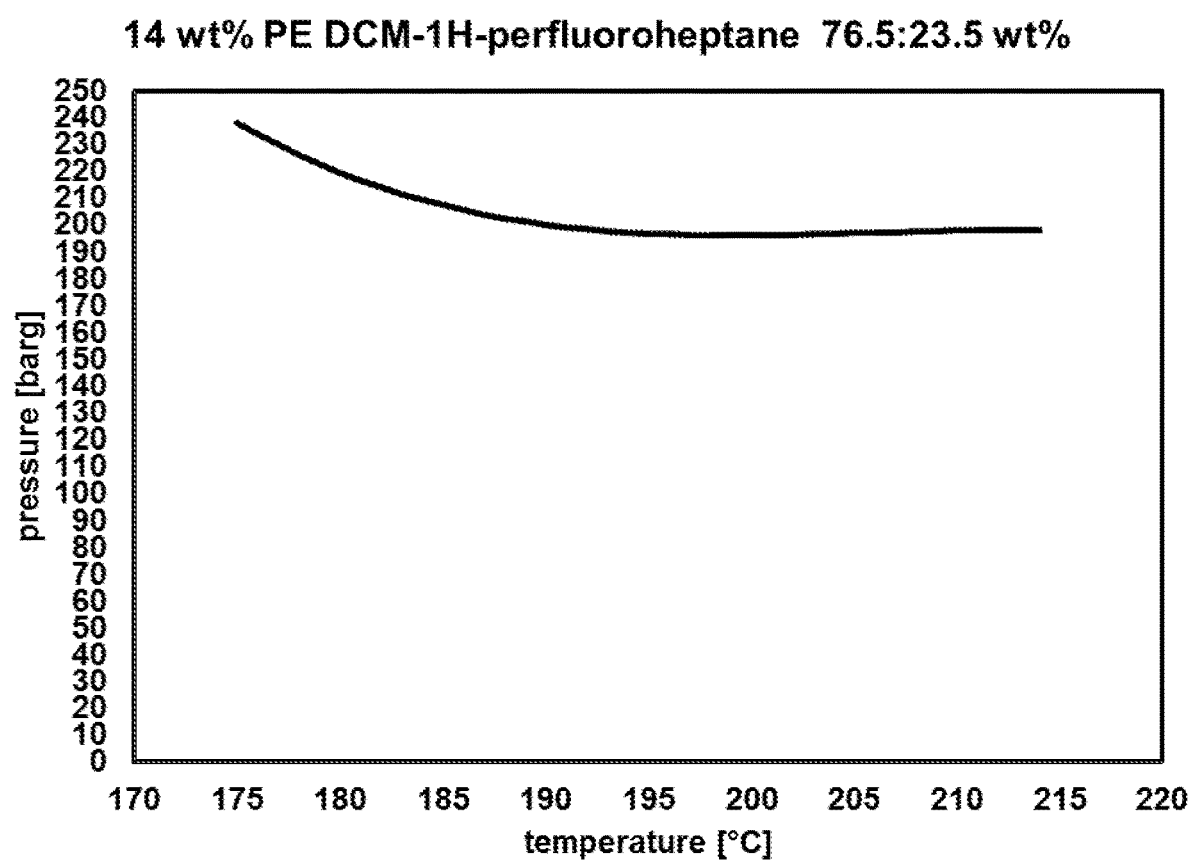
FIG. 19 Cloud point curve of 14 wt % high density polyethylene (HDPE) in a spin agent of DCM and 1H-perfluoroheptane in a 76.5:23.5 ratio by weight FIG. 20 Cloud point curve of 10 wt % PP in a spin agent of DCM and 1H-perfluoroheptane in a 71:29 ratio by weight.

FIG. 19 shows the cloud point curve of 14 wt % high density polyethylene in a spin agent of DCM and 1H-perfluoroheptane in a 76.5:23.5 ratio by weight. 14 wt % high density polyethylene was found soluble in a spin agent of DCM and 1H-perfluoroheptane in a 76.5:23.5 ratio by weight. Flash spin experiments were performed using the spinning equipment described for high density polyethylene polymer concentration of 14 wt % from a spin agent of DCM and 1H-perfluoroheptane in a 76.5:23.5 ratio by weight.

TABLE 9

Description of flash spin experiments of polyethylene

| Polymer | NAME | [—] | HDPE |
|---|---|---|---|
|  | Type | [—] | Total 5802 |
|  | Tot. | wt % | 14 |
| spin agent | 1 |  | DCM |
|  | 2 |  | 1H-perfluoroheptane |
|  | composition | wt %:wt % | 76.5/23.5 |
| spin condition | spin orifice | mil × mil | 30 × 30 |
|  | spin pressure | barg | 165 |
|  | spin temp. | ° C. | 210 |

Cloud Point Study and Flash Spin Performance of Polypropylene

Figure 20:
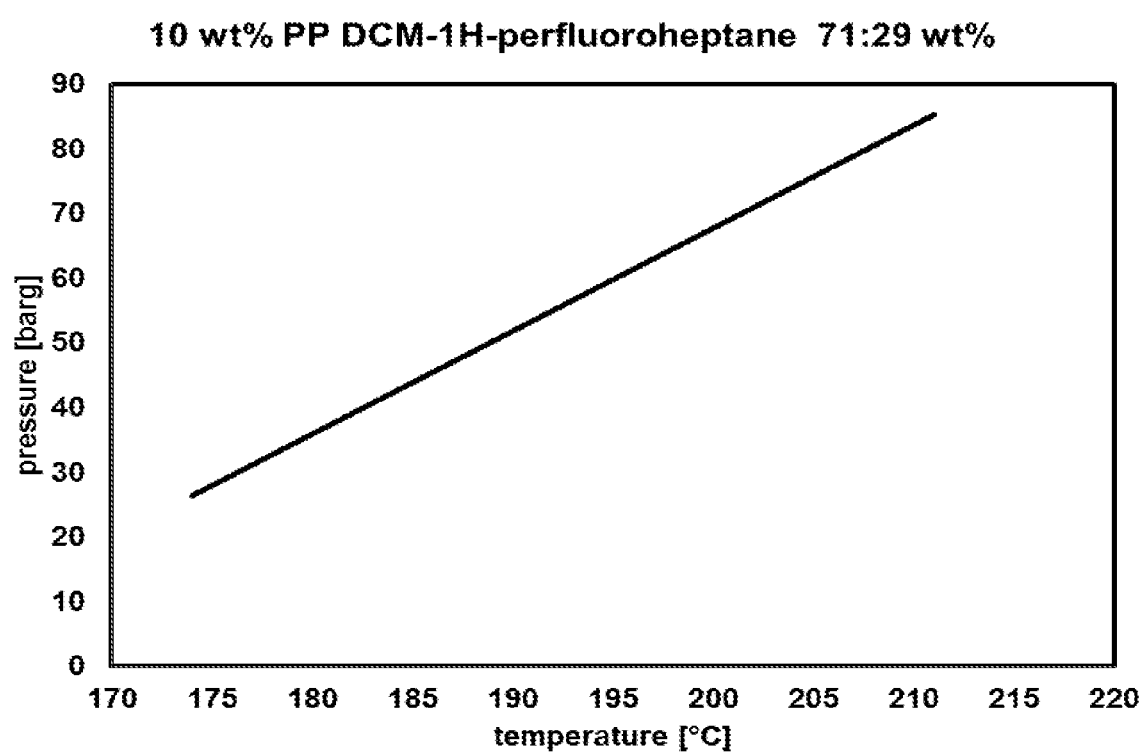
Figure 21:
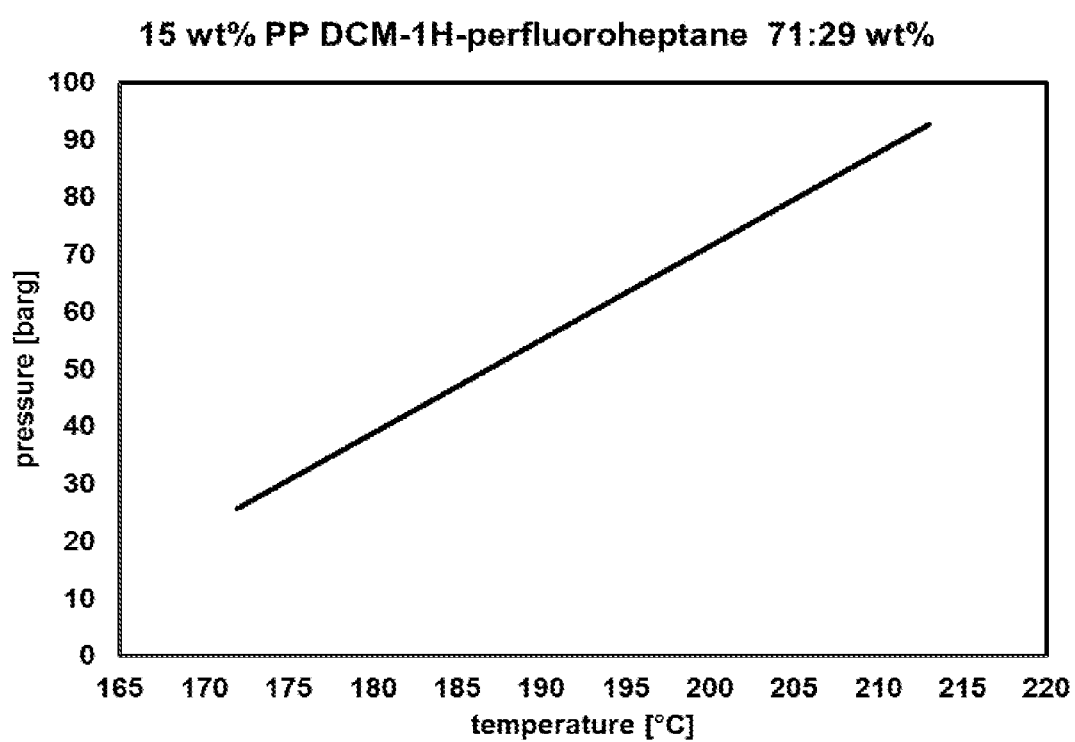
FIG. 21 Cloud point curve of 15 wt % PP in a spin agent of DCM and 1H-perfluoroheptane in a 71:29 ratio by weight.

FIG. 20 shows the cloud point curve of 10 wt % PP in a spin agent of DCM and 1H-perfluoroheptane in a 71:29 ratio by weight. FIG. 21 shows the cloud point curve of 15 wt % PP in a spin agent of DCM and 1H-perfluoroheptane in a 71:29 ratio by weight. 10 wt % and 15 wt % of polypropylene were found soluble in a spin agent of DCM and 1H-perfluoroheptane in a 71:29 ratio by weight.

Flash spin experiments are performed using the flash spinning equipment described for polypropylene polymer concentrations of 10 and 15 wt % from a spin agent of DCM and 1H-perfluoroheptane in a 71:29 ratio by weight.

TABLE 10

Description of flash spin experiments of polypropylene

| Polymer | NAME | [—] | PP | PP | PP |
|---|---|---|---|---|---|
|  | Type | [—] | Total PPH 4065 | | |
|  | Tot. | wt % | 15 | 10 | 10 |
| spin agent | 1 |  | DCM | | |
|  | 2 |  | 1H-perfluoroheptane | | |
|  | composition | wt %:wt % | 71/29 | 71/29 | 71/29 |
| spin condition | spin orifice | mil × mil | 30 × 30 | 30 × 30 | 30 × 30 |
|  | spin pressure | barg | 60 | 58 | 69 |
|  | spin temp. | ° C. | 200 | 200 | 210 |

Cloud Point Study and Flash Spin Performance of Polybutene-1

Figure 22:
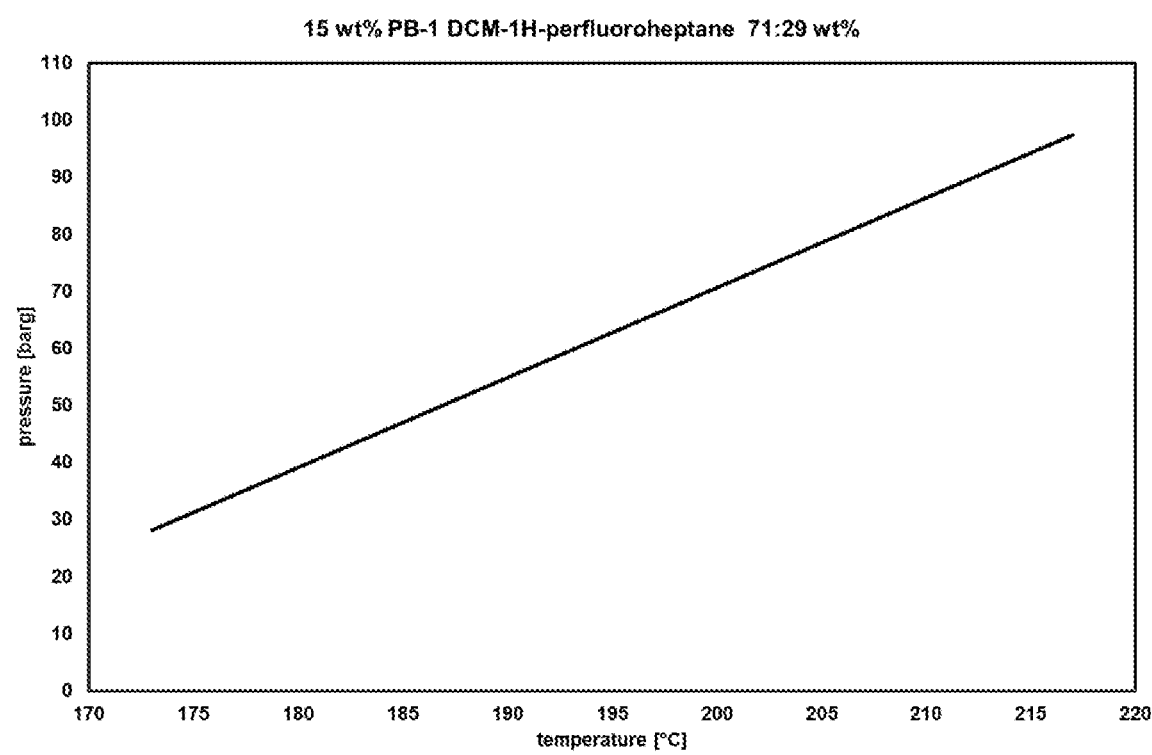
FIG. 22 Cloud point curve for 15 wt % PB-1 in a spin agent of DCM and 1H-perfluoroheptane in a 71:29 ratio by weight.

FIG. 22 shows the cloud point curve for 15 wt % PB-1 in a spin agent of DCM and 1H-perfluoroheptane in a 71:29 ratio by weight. 15 wt % polybutene-1 was found soluble in a spin agent consisting of DCM and 1H-perfluoroheptane in a 71:29 ratio by weight. Flash spin experiments were performed using the spinning equipment for blends of HDPE and PB-1 with a total concentration of 14 and 18 wt % from a spin agent of DCM and 1H-perfluoroheptane in a 81.5:18.5 ratio by weight.

TABLE 11

Description of flash spin experiments of blends of polyethylene and poly(butene-1)

| Polymer 1 | NAME | [—] | HDPE | HDPE |
|---|---|---|---|---|
|  | Type | [—] | Total 5802 | |
|  | Tot. | wt % | 80 | 60 |
| Polymer 2 | NAME | [—] | PB-1 | PB-1 |
|  | Type | [—] | PB 0300M | |
|  | Tot. | wt % | 20 | 40 |
| Total polymer concentration |  | wt % | 14 | 18 |
| spin agent | 1 |  | DCM | |
|  | 2 |  | 1H-perfluoroheptane | |
|  | composition | wt %:wt % | 81.5:18.5 | 81.5:18.5 |
| spin condition | spin orifice | mil × mil | 30 × 30 | 30 × 30 |
|  | spin pressure | barg | 86 | 88 |
|  | spin temp. | ° C. | 200 | 200 |

Cloud Point Study and Flash Spin Performance of Polyvinylidene Fluoride

Figure 23:
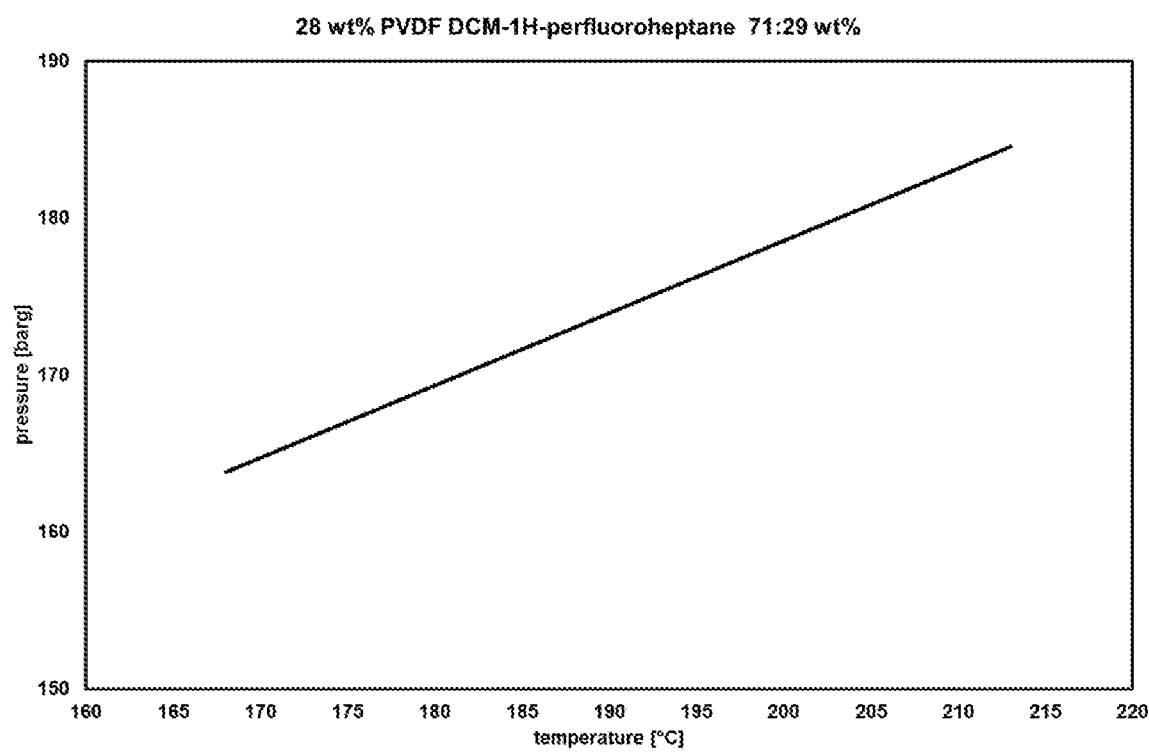
FIG. 23 Cloud point curve of 28 wt % PVDF/Kynar® 740 in a spin agent of DCM and 1H-perfluoroheptane in a 71:29 ratio by weight.
Figure 24:
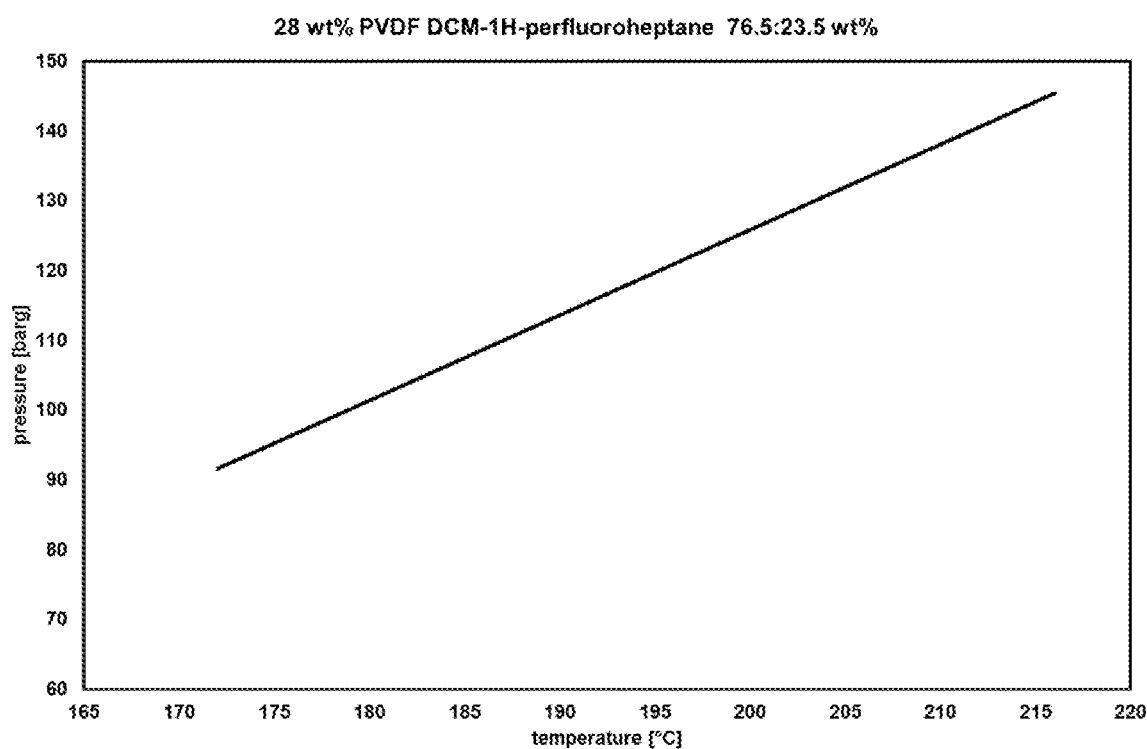
FIG. 24 Cloud point curve of 28 wt % PVDF/Kynar® 740 in a spin agent of DCM and 1H-perfluoroheptane in a 76.5:23.5 ratio by weight.

FIG. 23 shows the cloud point curve of 28 wt % PVDF/Kynar® 740 in a spin agent of DCM and 1H-perfluoroheptane in a 71:29 ratio by weight. FIG. 24 shows the cloud point curve of 28 wt % PVDF/Kynar® 740 in a spin agent of DCM and 1H-perfluoroheptane in a 76.5:23.5 ratio by weight. 28 wt % PVDF/Kynar® 740 was found soluble in spin agents of DCM and 1H-perfluoroheptane in a 71:29 and 76.5:23.5 ratio by weight, respectively. Flash spin experiments were performed using the spinning equipment for PVDF/Kynar® 740 with a polymer concentration of 28 wt % from spin agents consisting of DCM and 1H-perfluoroheptane in a 71:29 and 76.5:23.5 ratio by weight, respectively.

TABLE 12

Description of flash spin experiments of polyvinylidene fluoride

| Polymer | NAME | [—] | PVDF | PVDF |
|---|---|---|---|---|
|  | Type | [—] | Kynar ® 740 | |
|  | Tot. | wt % | 28 | 28 |
| spin agent | 1 |  | DCM | |
|  | 2 |  | 1H-perfluoroheptane | |
|  | composition | wt %:wt % | 76.5/23.5 | 71/29 |
| spin condition | spin orifice | mil × mil | 30 × 30 | 30 × 30 |
|  | spin pressure | barg | 103 | 158 |
|  | spin temp. | ° C. | 200 | 210 |

Cloud Point Study and Flash Spin Performance of Poly(Ethylene-Tetrafluoroethylene)

Figure 25:
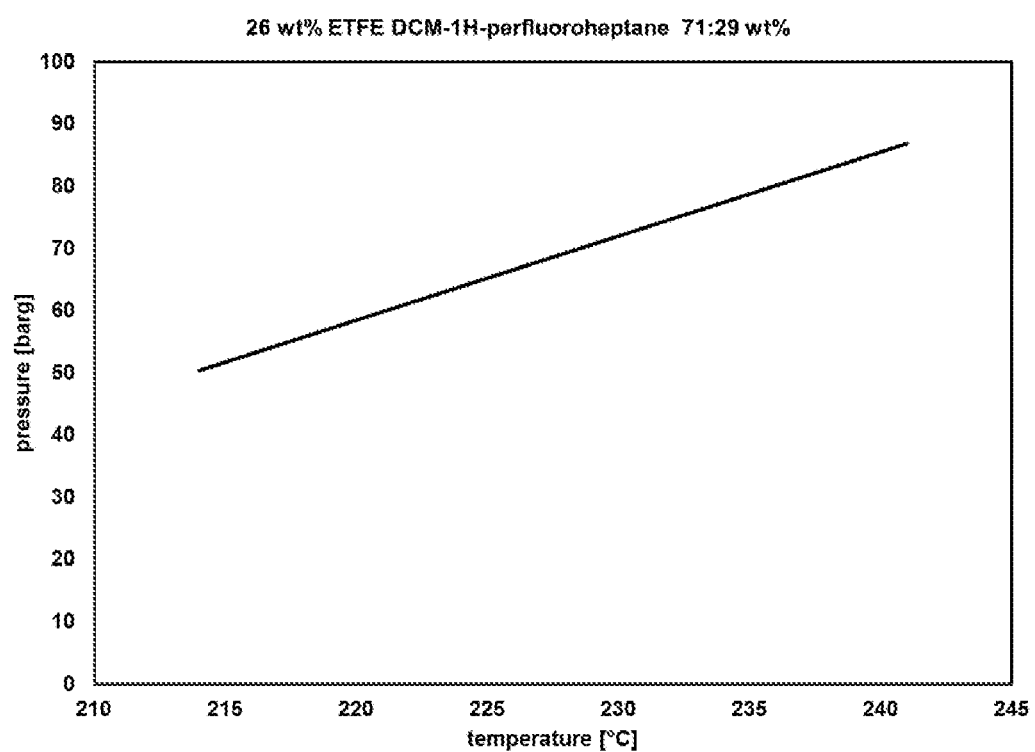
FIG. 25 Cloud point curve of 26 wt % ETFE in a spin agent of DCM and 1H-perfluoroheptane in a 71:29 ratio by weight.

FIG. 25 shows the cloud point curve of 26 wt % ETFE in a spin agent of DCM and 1H-perfluoroheptane in a 71:29 ratio by weight. 26 wt % ETFE was found soluble in a spin agent of DCM and 1H-perfluoroheptane in a 71:29 ratio by weight. Flash spin experiments were performed using the spinning equipment described before for 22, 26 and 30 wt %

ETFE from a spin agent consisting of DCM and 1H-perfluoroheptane in a 71:29 ratio by weight.

TABLE 13

Description of flash spin experiments of poly(ethylene tetrafluoroethylene)

| Polymer | NAME | [—] | ETFE | ETFE | ETFE |
|---|---|---|---|---|---|
| | Type | [—] | | Tefzel ® 2183 | |
| | Tot. | wt % | 22 | 26 | 30 |
| spin agent | 1 | | | DCM | |
| | 2 | | | 1H-perfluoroheptane | |
| | composition | wt %:wt % | 71/29 | 71/29 | 71/29 |
| spin condition | spin orifice | mil × mil | 30 × 30 | 30 × 30 | 30 × 30 |
| | spin pressure | barg | 69 | 64 | 70 |
| | spin temp. | ° C. | 230 | 235 | 240 |

Trans-1,2-Dichloroethylene:1H,6H-Perfluorohexane Vapor Liquid Equilibrium

Figure 26:
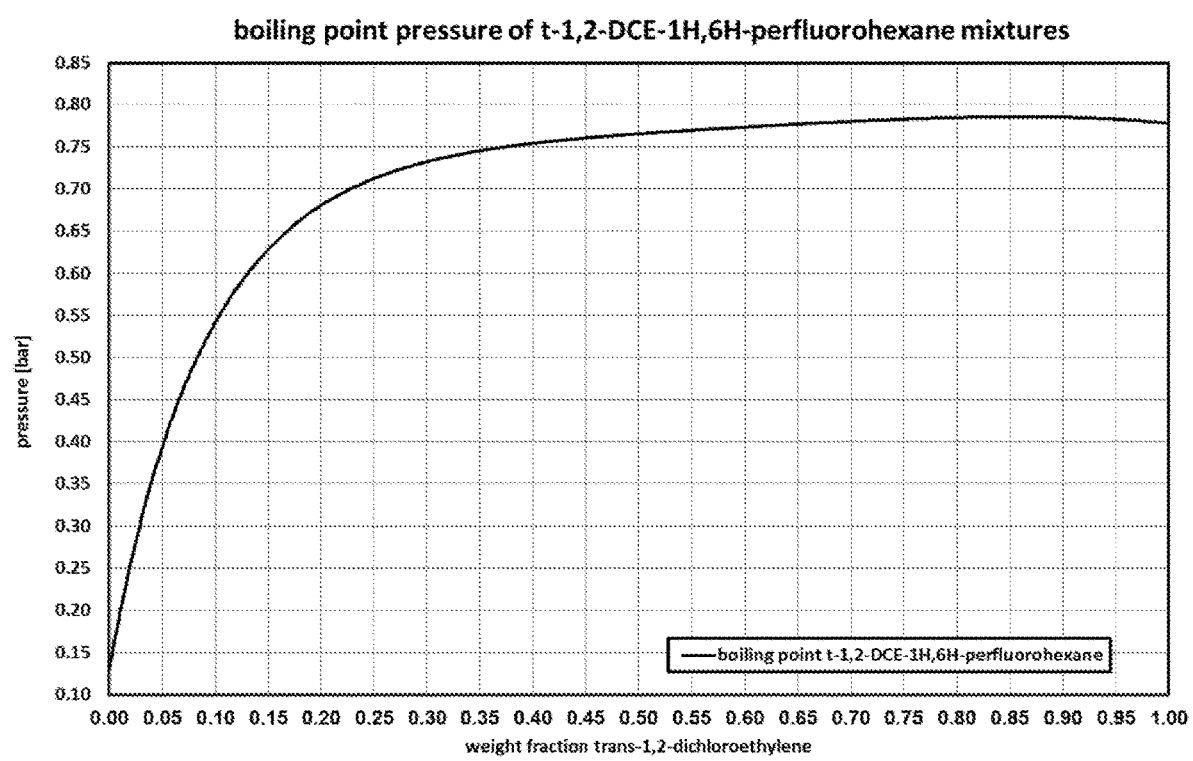
FIG. 26 shows a graph of boiling point pressures of trans-1,2-dichloroethylene and 1H,6H-perfluorohexane mixtures @ 40° C., as a function of the weight fraction of trans-1,2-dichloroethylene.

FIG. 26 shows a graph of boiling point pressures of mixtures of trans-1,2-dichloroethylene and 1H,6H-perfluorohexane @ 40° C., as a function of the weight fraction of trans-1,2-dichloroethylene. The azeotropic composition of trans-1,2-dichloroethylene and 1H,6H-perfluorohexane at 40° C. corresponds to about 86 wt % trans-1,2-dichloroethylene and about 14 wt % 1H,6H-perfluorohexane. The dew point and boiling point at 40° C. for the azeotropic composition is equal to about 78.5 kPa. Azeotropic-like composition with a variation between the dew point and boiling point less than 5% can be defined from a weight ratio of trans-1,2-dichloroethylene to 1H,6H-perfluorohexane of about 72:28 wt % to about 100:0 wt %.

Cloud Point Study and Flash Spinning of Polyethylene

Figure 27:
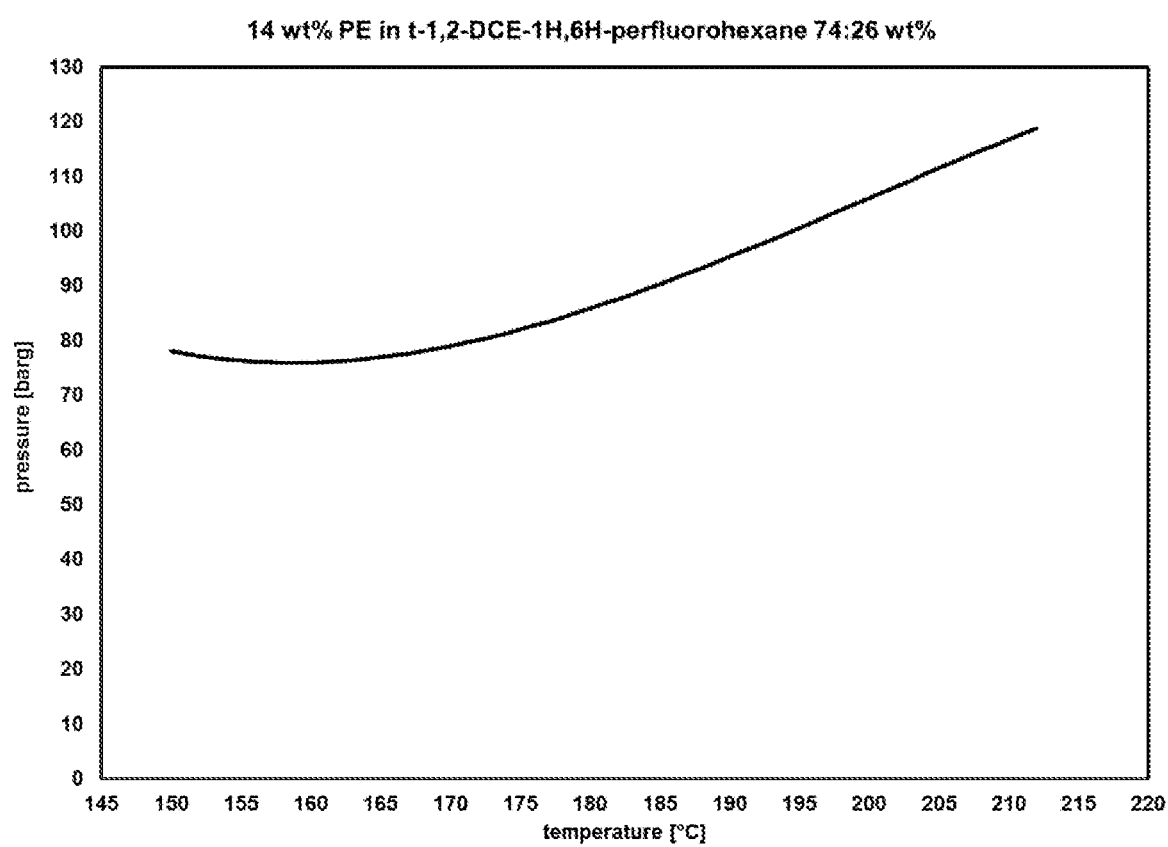
FIG. 27 Cloud point curve of 14 wt % high density polyethylene(HDPE) in a spin agent of trans-1,2-dichloroethylene and 1H,6H-perfluorohexane in a 74:26 ratio by weight.

FIG. 27 shows the cloud point curve of 14 wt % high density polyethylene (HDPE) in a spin agent of trans-1,2-dichloroethylene and 1H,6H-perfluorohexane in a 74:26 ratio by weight. 14 wt % of high density polyethylene was found soluble in a spin agent of trans-1,2-dichloroethylene and 1H,6H-perfluorohexane in a 74:26 ratio by weight. Flash spin experiments were successfully performed using the spinning equipment described for 14 wt % PE from a spin agent consisting of t-1,2-DCE and 1H,6H-perfluorohexane in a 76:24 ratio by weight.

TABLE 15

Description of flash spin experiments of polyethylene

| Polymer | NAME | [—] | HDPE |
|---|---|---|---|
| | Type | [—] | Total 5802 |
| | Tot. | wt % | 14 |
| spin agent | 1 | | t-1,2-DCE |
| | 2 | | 1H,6H-perfluorohexane |
| | composition | wt %:wt % | 76/24 |
| spin condition | spin orifice | mil × mil | 30 × 30 |
| | spin pressure | barg | 71 |
| | spin temp. | ° C. | 185 |

Trans-1,2-dichloroethylene:1H-perfluorohexane vapor liquid equilibrium

Figure 28:
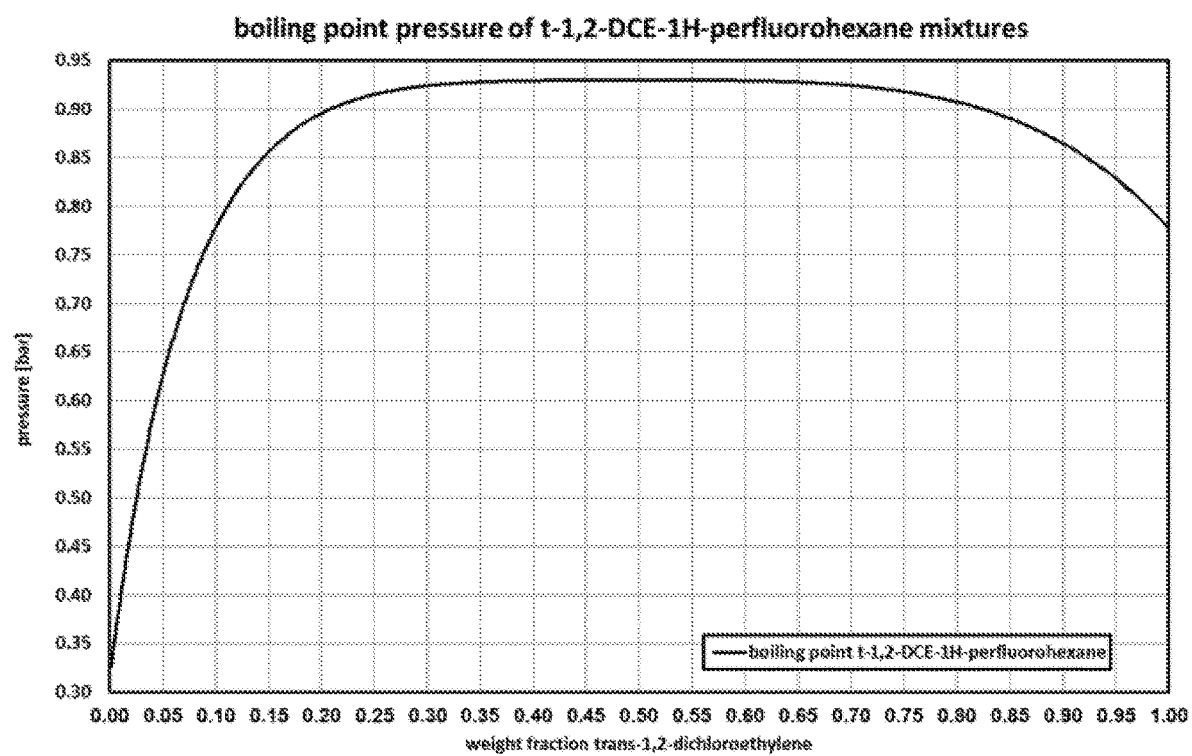
FIG. 28 shows a graph of boiling point pressures of trans-1,2-dichloroethylene and 1H-perfluorohexane mixtures @ 40° C., as a function of the weight fraction of trans-1,2-dichloroethylene.

FIG. 28 shows a graph of boiling point pressures of mixtures of trans-1,2-dichloroethylene and 1H-perfluorohexane @ 40° C., as a function of the weight fraction of trans-1,2-dichloroethylene. The azeotropic composition of trans-1,2-dichloroethylene and 1H-perfluorohexane at 40° C. corresponds to about 51 wt % trans-1,2-dichloroethylene and about 49 wt % 1H-perfluoroheptane. The dew point and boiling point at 40° C. for the azeotropic composition is equal to about 93 kPa. Azeotropic-like composition with a variation between the dew point and boiling point less than 5% can be defined from a weight ratio of trans-1,2-dichloroethylene to 1H-perfluorohexane of about 47:53 wt % to about 64:36 wt %.

Cloud Point Study and Flash Spinning of Polypropylene

Figure 29:
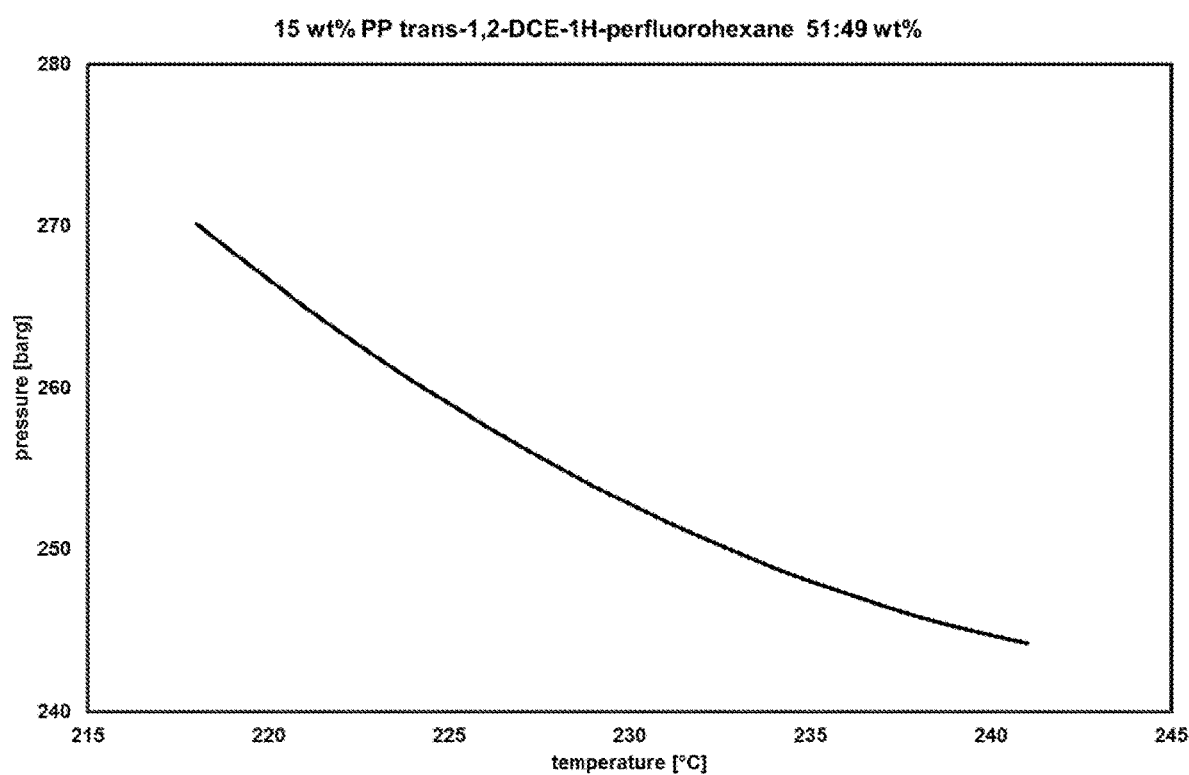
FIG. 29 Cloud point curve of 15 wt % PP in a spin agent of trans-1,2-dichloroethylene and 1H-perfluorohexane in a 51:49 ratio by weight.

FIG. 29 shows the cloud point curve of 15 wt % polypropylene (PP) in a spinagent of trans-1,2-dichloroethylene and 1H-perfluorohexane in a 51:49 ratio by weight. 15 wt % of polypropylene was found soluble in a spin agent of trans-1,2-dichloroethylene and 1H-perfluorohexane in a 51:49 ratio by weight. Flash spin experiments were successfully performed using the spinning equipment described for a polypropylene polymer concentration of 15 wt % from a spin agent of trans-1,2-dichloroethylene and 1H-perfluorohexane in a 51:49 ratio by weight.

TABLE 14

Description of flash spin experiments of polypropylene (PP).

| Polymer | NAME | [—] | PP |
|---|---|---|---|
| | Type | [—] | Total PPH |
| | Tot. | wt % | 15 |
| spin agent | 1 | | t-1,2-DCE |
| | 2 | | 1H-perfluorohexane |
| | composition | wt %:wt % | 51/49 |
| spin condition | spin orifice | mil × mil | 30 × 30 |
| | Pressure | bar g | 235 |
| | temperature | ° C. | 230 |

Trans-1,2-dichloroethylene:1H-perfluoroheptane vapor liquid equilibrium

Figure 30:
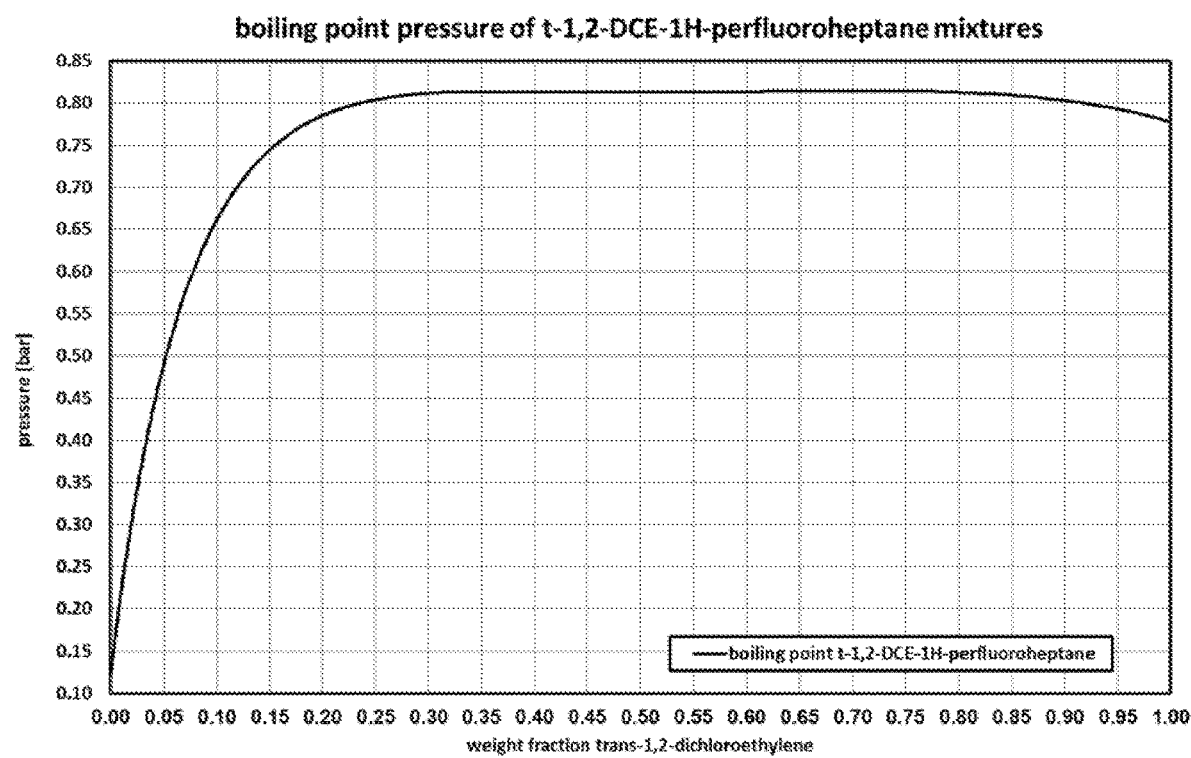
FIG. 30 shows a graph of boiling point pressures of trans-1,2-dichloroethylene and 1H-perfluoroheptane mixtures @ 40° C., as a function of the weight fraction of trans-1,2-dichloroethylene.

FIG. 30 shows a graph of boiling point pressures of mixtures of trans-1,2-dichloroethylene and 1H-perfluoroheptane @ 40° C., as a function of the weight fraction of trans-1,2-dichloroethylene. The azeotropic composition of trans-1,2-dichloroethylene and 1H-perfluoroheptane at 40° C. corresponds to about 71 wt % trans-1,2-dichloroethylene and about 29 wt % 1H-perfluoroheptane. The dew point and boiling point at 40° C. for the azeotropic composition is equal to about 81.4 kPa. Azeotropic-like composition with a variation between the dew point and boiling point less than 5% can be defined from a weight ratio of trans-1,2-dichloroethylene to 1H-perfluoroheptane of about 67:33 wt % to about 100:0 wt %.

Cloud Point Study and Flash Spinning of Polyethylene

Figure 31:
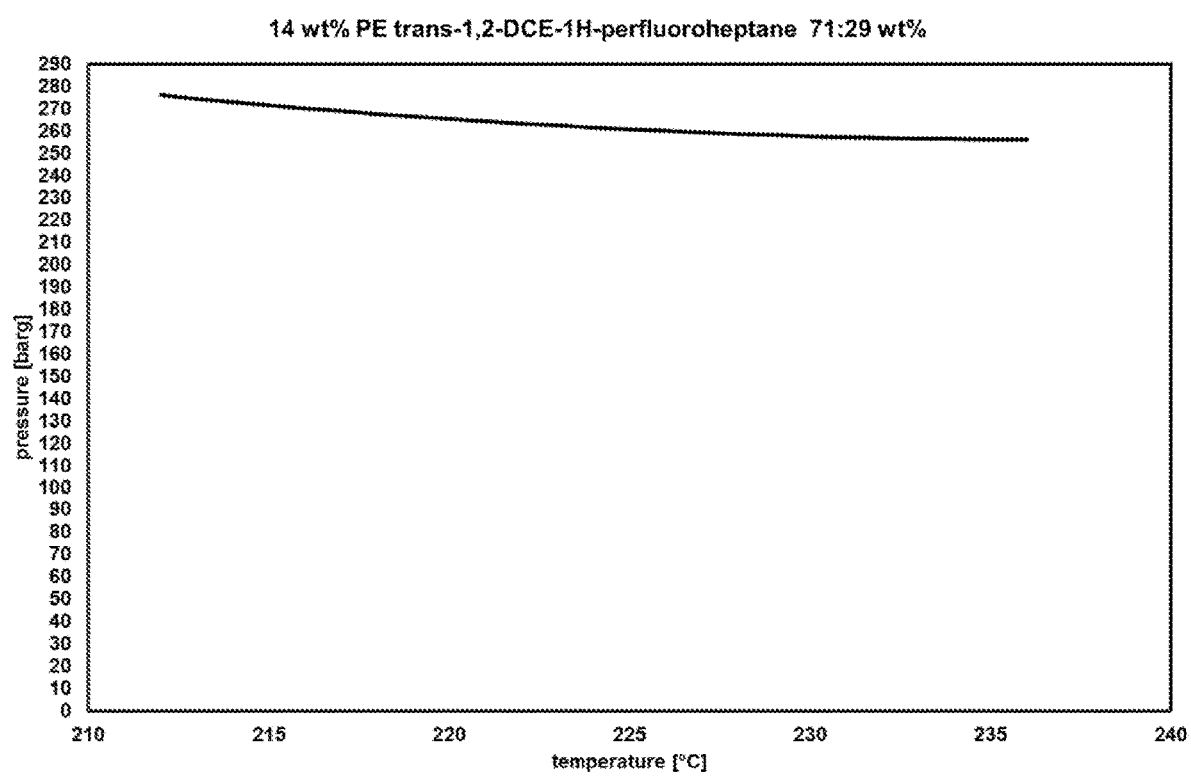
FIG. 31 Cloud point curve of 14 wt % high density polyethylene(HDPE) in a spin agent of trans-1,2-dichloroethylene and 1H-perfluoroheptane in a 71:29 ratio by weight.

FIG. 31 shows the cloud point curve of 14 wt % high density polyethylene (HDPE) in a spinagent of trans-1,2-dichloroethylene and 1H-perfluoroheptane in a 71:29 ratio by weight. 14 wt % of high density polyethylene was found soluble in a spin agent of trans-1,2-dichloroethylene and 1H-perfluoroheptane in a 71:29 ratio by weight.

Flash spin experiments were successfully performed using the spinning equipment described for a high density polyethylene polymer concentration of 14 wt % from a spin agent of trans-1,2-dichloroethylene and 1H-perfluoroheptane in a 71:29 ratio by weight.

TABLE 16

Description of flash spin experiments of high density polyethylene (HDPE).

| Polymer | NAME | [—] | HDPE |
|---|---|---|---|
| | Type | [—] | Total 5802 |
| | Tot. | wt % | 14 |
| spin agent | 1 | | t-1,2-DCE |
| | 2 | | 1H-perfluoroheptane |
| | composition | wt %:wt % | 71/29 |
| spin condition | spin orifice | mil × mil | 30 × 30 |
| | Pressure | bar g | 225 |
| | temperature | ° C. | 230 |

Cloud Point Study of Polypropylene

Figure 32:
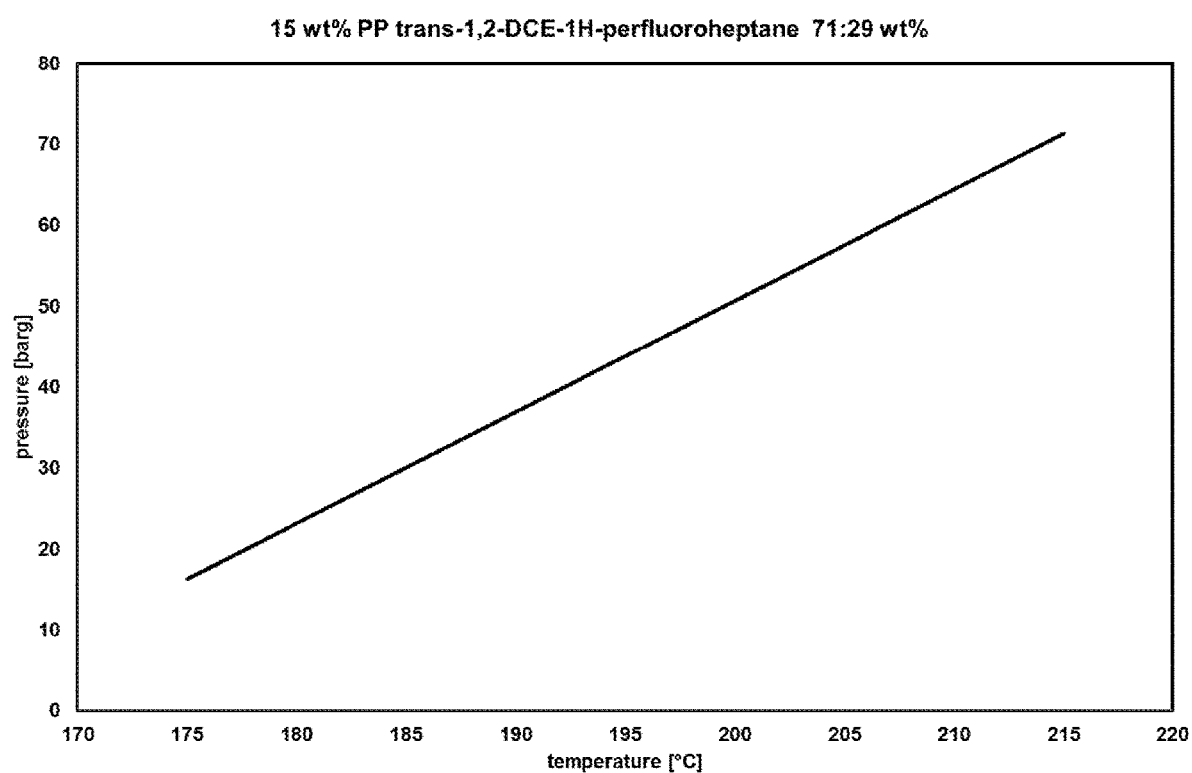
FIG. 32 Cloud point curve for 15 wt % PP in a spin agent of trans-1,2-dichloroethylene and 1H-perfluoroheptane in a 71:29 ratio by weight.

FIG. 32 shows the cloud point curve of 15 wt % polypropylene (PP) in a spinagent of trans-1,2-dichloroethylene and 1H-perfluoroheptane in a 71:29 ratio by weight. 15 wt % of polypropylene was found soluble in a spin agent of trans-1,2-dichloroethylene and 1H-perfluoroheptane in a 71:29 ratio by weight.

The invention claimed is:

1. A process for the preparation of plexifilamentary film-fibril strands of polymer which comprises the steps of:
   (i) combining a spin fluid that is a solution comprising (a) 5 to 30 wt. % of total spin fluid being a polymer of one or more polymer types, (b) a primary spin agent selected from the group consisting of dichloromethane; cis-1,2 dichloroethylene and trans-1,2-dichloroethylene, and (c) a co-spin agent selected from the group consisting of 1H,6H-perfluorohexane, 1H-perfluoroheptane, and 1H-perfluorohexane, and
   (ii) flash-spinning the spin fluid at a pressure that is greater than an autogenous pressure of the spin fluid into a region of lower pressure to form plexifilamentary film-fibril strands of the polymer wherein;
the co-spin agent being present in the spin fluid in an amount sufficient to form an azeotrope composition or a composition having a boiling point pressure and a dew point pressure that are different by less than 5% with both pressures expressed in absolute pressure, with the primary spin agent in the presence of the polymer, and
the co-spin agent being present in the spin fluid in an amount sufficient to form a cloud point.

2. The process of claim 1 in which the primary spin agent is dichloromethane, the co-spin agent is 1H,6H-perfluorohexane and the ratio of dichloromethane to 1 H,6H-perfluorohexane is between 73:27 and 100:0 by weight of total spin agent.

3. The process of claim 2 wherein the polymer is polyethylene, polypropylene, polybutene-1, poly(4-methyl-1-pentene), polyvinylidenefluoride, or blends of the foregoing.

4. The process of claim 1 in which the primary spin agent is dichloromethane, the co-spin agent is 1H-perfluorohexane and the ratio of dichloromethane to 1 H-perfluorohexane is between 52:48 and 66:34 by weight.

5. The process of claim 4 wherein the polymer is polypropylene, polybutene-1, poly(4-methyl-1-pentene), polyvinylidenefluoride, poly (ethylene tetrafluoroethylene) or blends of the foregoing.

6. The process of claim 1 in which the primary spin agent is dichloromethane, the co-spin agent is 1H-perfluoroheptane and the ratio of dichloromethane to 1H-perfluoroheptane is between 70:30 and 89:11 ratio by weight.

7. The process of claim 6 wherein the polymer is polyethylene, polypropylene, polybutene-1, poly(4-methyl-1-pentene), polyvinylidenefluoride, poly (ethylene tetrafluoroethylene) or blends of the foregoing.

8. The process of claim 1 in which the primary spin agent is trans-1,2-dichloroethylene, the co-spin agent is 1H,6H-perfluorohexane and the ratio of trans-1,2-dichloroethylene to 1 H,6H-perfluorohexane is between 72:28 and 100:0 ratio by weight.

9. The process of claim 8 wherein the polymer is polyethylene, polypropylene, polybutene-1, poly(4-methyl-1-pentene), poly (ethylene tetrafluoroethylene) or blends of the foregoing.

10. The process of claim 1 in which the primary spin agent is trans-1,2-dichloroethylene, the co-spin agent is 1H-perfluorohexane and the ratio of trans-1,2-dichloroethylene to 1H-perfluorohexane is between 47:53 and 64:36 ratio by weight.

11. The process of claim 10 wherein the polymer is polypropylene, polybutene-1, poly(4-methyl-1-pentene), poly(ethylene tetrafluoroethylene) or blends of the foregoing.

12. The process of claim 1 in which the primary spin agent is trans-1,2-dichloroethylene, the co-spin agent is 1H-perfluoroheptane and the ratio of trans-1,2-dichloroethylene to 1H-perfluoroheptane is between 67:33 and 100:0 ratio by weight.

13. The process of claim 12 wherein the polymer is polyethylene, polypropylene, polybutene-1, poly(4-methyl-1-pentene), poly(ethylene tetrafluoroethylene) or blends of the foregoing.

* * * * *